(12) United States Patent
Chen et al.

(10) Patent No.: US 11,385,437 B2
(45) Date of Patent: Jul. 12, 2022

(54) LENS ASSEMBLY

(71) Applicants: Sintai Optical (Shenzhen) Co., Ltd., ShenZhen (CN); Asia Optical Co., Inc., Taichung (TW)

(72) Inventors: Bo-Yan Chen, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 251 days.

(21) Appl. No.: 16/695,435

(22) Filed: Nov. 26, 2019

(65) Prior Publication Data

US 2020/0241240 A1 Jul. 30, 2020

(30) Foreign Application Priority Data

Jan. 29, 2019 (CN) .......................... 201910084738.3

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
CPC ... G02B 9/60; G02B 9/62; G02B 9/64; G02B 13/0045; G02B 13/005; G02B 13/0055
USPC ................ 359/754–757, 759, 763–764, 767
See application file for complete search history.

(56) References Cited

U.S. PATENT DOCUMENTS

| | | | |
|---|---|---|---|
| 8,351,132 B2 | 1/2013 | Uchida | |
| 8,917,458 B2 | 12/2014 | Tsai et al. | |
| 9,285,565 B2 | 3/2016 | Tanaka et al. | |
| 10,209,487 B2 | 2/2019 | Chen et al. | |
| 10,310,230 B2 | 6/2019 | Chen et al. | |
| 2015/0198790 A1* | 7/2015 | Tanaka ............... | G02B 13/0045 |
| | | | 359/714 |
| 2016/0170176 A1* | 6/2016 | Liao .................. | G02B 13/0045 |
| | | | 348/360 |
| 2016/0274333 A1* | 9/2016 | Tang ........................ | G02B 9/60 |
| 2017/0045714 A1* | 2/2017 | Huang ..................... | G02B 9/64 |
| 2017/0184816 A1 | 6/2017 | Tsai et al. | |
| 2018/0052303 A1* | 2/2018 | Tang ...................... | G02B 5/208 |

(Continued)

FOREIGN PATENT DOCUMENTS

| | | |
|---|---|---|
| CN | 102193169 A | 9/2011 |
| CN | 102478704 A | 5/2012 |

(Continued)

*Primary Examiner* — Jordan M Schwartz
(74) *Attorney, Agent, or Firm* — McClure, Qualey & Rodack, LLP

(57) ABSTRACT

A lens assembly includes a first lens, a second lens, a third lens, a fourth lens, and a fifth lens, all of which are arranged in order from an object side to an image side along an optical axis. The first lens is with positive refractive power and includes a convex surface facing the object side. The second lens is with refractive power. The third lens is with negative refractive power. The fourth lens is with positive refractive power and includes a convex surface facing the image side. The fifth lens is with negative refractive power and includes a concave surface facing the image side. The lens assembly satisfies: $1.5 < f/D_1 < 3.5$; wherein f is an effective focal length of the lens assembly and Di is an effective optical diameter of the first lens.

18 Claims, 20 Drawing Sheets

(56) References Cited

U.S. PATENT DOCUMENTS

| | | | |
|---|---|---|---|
| 2018/0188492 A1 | 7/2018 | Chang et al. | |
| 2019/0170983 A1* | 6/2019 | Li | G02B 13/0045 |
| 2019/0377161 A1* | 12/2019 | Lin | G02B 13/0045 |
| 2019/0391367 A1* | 12/2019 | Kuo | G02B 9/62 |
| 2020/0049948 A1* | 2/2020 | Kuo | G02B 27/0037 |
| 2020/0209566 A1* | 7/2020 | Wang | G02B 13/18 |
| 2020/0409056 A1* | 12/2020 | Ma | G02B 27/0012 |

FOREIGN PATENT DOCUMENTS

| | | |
|---|---|---|
| CN | 202486400 U | 10/2012 |
| CN | 204422853 A | 6/2015 |
| CN | 108267835 A | 7/2018 |
| TW | M547106 U | 8/2017 |
| TW | I603114 B | 10/2017 |
| TW | I629503 B | 7/2018 |
| TW | I639037 B | 10/2018 |
| TW | I640809 B | 11/2018 |

* cited by examiner

LENS ASSEMBLY

BACKGROUND OF THE INVENTION

Field of the Invention

The invention relates to a lens assembly.

Description of the Related Art

The current development trend of a lens assembly is toward miniaturization. Additionally, the lens assembly is developed to have high resolution and reduced effective optical diameter of the lens closest to the object side in accordance with different application requirements. However, the known lens assembly can't satisfy such requirements. Therefore, the lens assembly needs a new structure in order to meet the requirements of miniaturization, high resolution, and reduced effective optical diameter of the lens closest to the object side at the same time.

BRIEF SUMMARY OF THE INVENTION

The invention provides a lens assembly to solve the above problems. The lens assembly of the invention is provided with characteristics of a shortened total lens length, a higher resolution, a smaller effective optical diameter of the lens closest to the object side, and still has a good optical performance.

The lens assembly in accordance with an exemplary embodiment of the invention includes a first lens, a second lens, a third lens, a fourth lens, and a fifth lens, all of which are arranged in order from an object side to an image side along an optical axis. The first lens is with positive refractive power and includes a convex surface facing the object side. The second lens is with refractive power. The third lens is with negative refractive power. The fourth lens is with positive refractive power and includes a convex surface facing the image side. The fifth lens is with negative refractive power and includes a concave surface facing the image side. The lens assembly satisfies: $1.5<f/D_1<3.5$; wherein f is an effective focal length of the lens assembly and $D_1$ is an effective optical diameter of the first lens.

In another exemplary embodiment, the second lens is with positive refractive power and includes a convex surface facing the image side.

In yet another exemplary embodiment, the second lens is a biconcave lens with negative refractive power, the third lens is a biconcave lens, and the fifth lens further includes a concave surface facing the object side.

In another exemplary embodiment, the lens assembly satisfies: $61\times10^{-6}/°C.<CTE_1+CTE_2<81\times10^{-6}/°C.$; wherein $CTE_1$ is a coefficient of thermal expansion of the first lens and $CTE_2$ is a coefficient of thermal expansion of the second lens.

In yet another exemplary embodiment, the lens assembly satisfies: $2<f/T_1<4$; wherein f is an effective focal length of the lens assembly and $T_1$ is a thickness of the first lens along the optical axis.

In another exemplary embodiment, the lens assembly satisfies: $4<TTL/AAG<12$; wherein TTL is an interval from the convex surface of the first lens to an image plane along the optical axis and AAG is a total air interval from an image side surface of the first lens to an object side surface of a lens which is closest to the image side along the optical axis.

In yet another exemplary embodiment, the lens assembly satisfies: $1<T_1/AAG<4$; wherein $T_1$ is a thickness of the first lens along the optical axis and AAG is a total air interval from an image side surface of the first lens to an object side surface of a lens which is closest to the image side along the optical axis.

In another exemplary embodiment, the lens assembly satisfies: $0.8<(f_4+T_1)/f<2.5$; wherein f is an effective focal length of the lens assembly, $f_4$ is an effective focal length of the fourth lens, and $T_1$ is a thickness of the first lens along the optical axis.

In yet another exemplary embodiment, the lens assembly satisfies: $0.10<D_1/ALD<0.15$; wherein $D_1$ is an effective optical diameter of the first lens and ALD is a total effective optical diameter of the first lens, the second lens, the third lens, the fourth lens, and the fifth lens.

In another exemplary embodiment, the lens assembly satisfies: $2<TTL/T_1<5$; wherein TTL is an interval from the convex surface of the first lens to an image plane along the optical axis and $T_1$ is a thickness of the first lens along the optical axis.

The lens assembly in accordance with another exemplary embodiment of the invention includes a first lens, a second lens, a third lens, a fourth lens, and a fifth lens, all of which are arranged in order from an object side to an image side along an optical axis. The first lens is with positive refractive power and includes a convex surface facing the object side. The second lens is with refractive power. The third lens is with negative refractive power. The fourth lens is with positive refractive power and includes a convex surface facing the image side. The fifth lens is with negative refractive power and includes a concave surface facing the image side. The lens assembly satisfies: $4<TTL/AAG<12$; wherein TTL is an interval from the convex surface of the first lens to an image plane along the optical axis and AAG is a total air interval from an image side surface of the first lens to an object side surface of a lens which is closest to the image side along the optical axis.

In another exemplary embodiment, the lens assembly satisfies: $2<TTL/T_1<5$; $2<f/T_1<4$; wherein TTL is an interval from the convex surface of the first lens to an image plane along the optical axis, $T_1$ is a thickness of the first lens along the optical axis, and f is an effective focal length of the lens assembly.

In yet another exemplary embodiment, the lens assembly satisfies: $0.10<D_1/ALD<0.15$; $1<T_1/AAG<4$; wherein $D_1$ is an effective optical diameter of the first lens, ALD is a total effective optical diameter of the first lens, the second lens, the third lens, the fourth lens, and the fifth lens, AAG is a total air interval from an image side surface of the first lens to an object side surface of a lens which is closest to the image side along the optical axis, and $T_1$ is a thickness of the first lens along the optical axis.

In another exemplary embodiment, the lens assembly satisfies: $1.5<f/D_1<3.5$; wherein f is an effective focal length of the lens assembly and $D_1$ is an effective optical diameter of the first lens.

The lens assembly in accordance with another exemplary embodiment of the invention includes a first lens, a second lens, a third lens, a fourth lens, and a fifth lens, all of which are arranged in order from an object side to an image side along an optical axis. The first lens is with positive refractive power and includes a convex surface facing the object side. The second lens is with refractive power. The third lens is with negative refractive power. The fourth lens is with positive refractive power and includes a convex surface facing the image side. The fifth lens is with negative refractive power and includes a concave surface facing the image side. The lens assembly satisfies: $0.10<D_1/$ ALD<0.15; wherein $D_1$ is an effective optical diameter of the first lens and ALD is a total effective optical diameter of the first lens, the second lens, the third lens, the fourth lens, and the fifth lens.

In another exemplary embodiment, the lens assembly satisfies at least one of the following conditions: $61 \times 10^{-6}/°C. < CTE_1 + CTE_2 < 81 \times 10^{-6}/°C.$; $2 < TTL/T_1 < 5$; $2 < f/T_1 < 4$; $4 < TTL/AAG < 12$; $0.8 < (f_4 + T_1)/f < 2.5$; $1 < T_1/AAG < 4$; $1.5 < f/D_1 < 3.5$; wherein $CTE_1$ is a coefficient of thermal expansion of the first lens, $CTE_2$ is a coefficient of thermal expansion of the second lens, TTL is an interval from the convex surface of the first lens to an image plane along the optical axis, $T_1$ is a thickness of the first lens along the optical axis, f is an effective focal length of the lens assembly, AAG is a total air interval from an image side surface of the first lens to an object side surface of a lens which is closest to the image side along the optical axis, $f_4$ is an effective focal length of the fourth lens, and $D_1$ is an effective optical diameter of the first lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
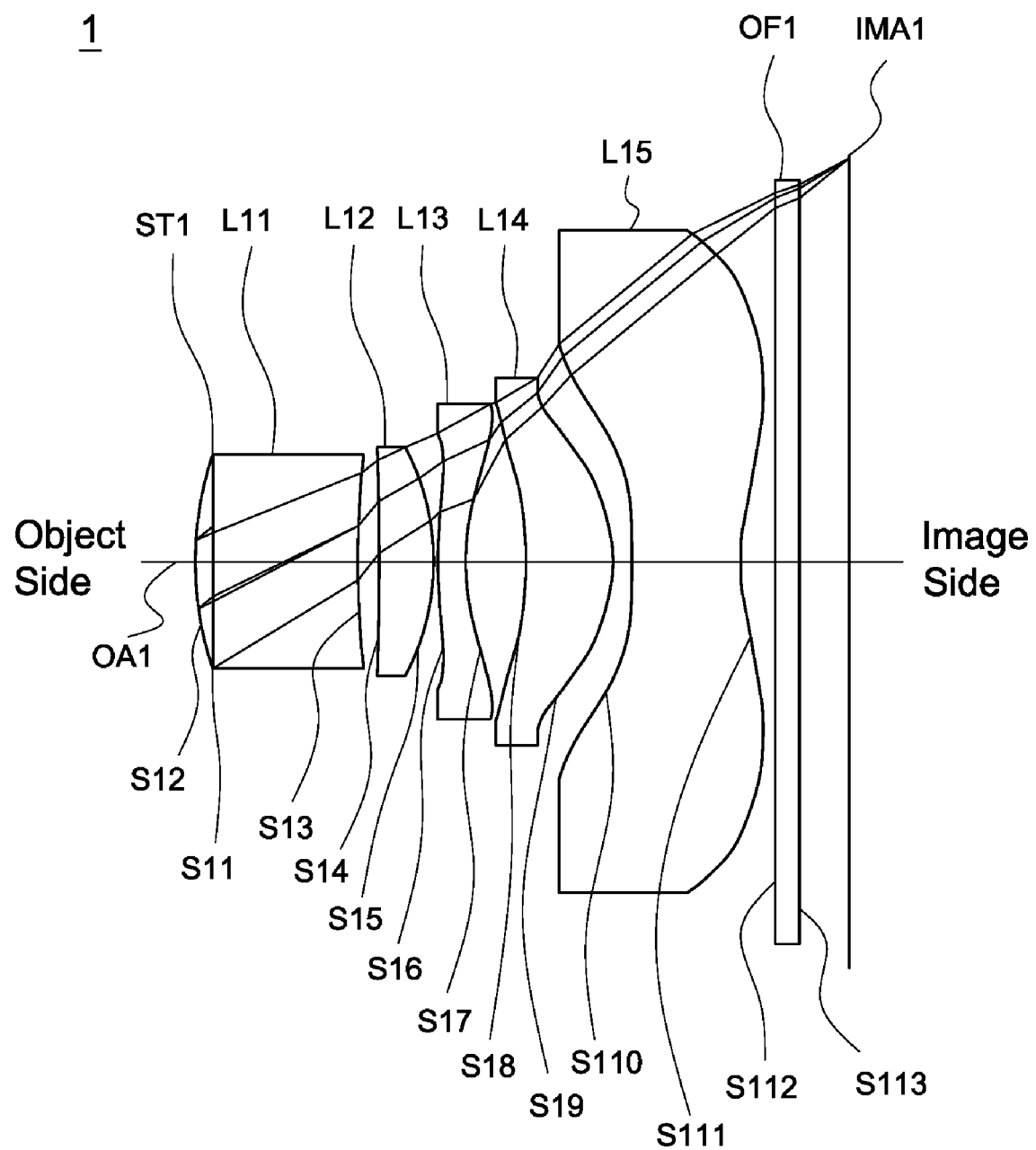
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, and a fifth lens. The first lens is with positive refractive power and includes a convex surface facing an object side. The second lens is with refractive power. The third lens is with negative refractive power. The fourth lens is with positive refractive power and includes a convex surface facing the image side. The fifth lens is with negative refractive power and includes a concave surface facing the image side. The first lens, the second lens, the third lens, the fourth lens, and the fifth lens are arranged in order from the object side to the image side along an optical axis. The lens assembly satisfies: $1.5 < f/D_1 < 3.5$; wherein f is an effective focal length of the lens assembly and $D_1$ is an effective optical diameter of the first lens.

The present invention provides another lens assembly including a first lens, a second lens, a third lens, a fourth lens, and a fifth lens. The first lens is with positive refractive power and includes a convex surface facing an object side. The second lens is with refractive power. The third lens is with negative refractive power. The fourth lens is with positive refractive power and includes a convex surface facing the image side. The fifth lens is with negative refractive power and includes a concave surface facing the image side. The first lens, the second lens, the third lens, the fourth lens, and the fifth lens are arranged in order from the object side to the image side along an optical axis. The lens assembly satisfies: $4 < TTL/AAG < 12$; wherein TTL is an interval from the convex surface of the first lens to an image plane along the optical axis and AAG is a total air interval from an image side surface of the first lens to an object side surface of a lens which is closest to the image side along the optical axis.

The present invention provides another lens assembly including a first lens, a second lens, a third lens, a fourth lens, and a fifth lens. The first lens is with positive refractive power and includes a convex surface facing an object side. The second lens is with refractive power. The third lens is with negative refractive power. The fourth lens is with positive refractive power and includes a convex surface facing the image side. The fifth lens is with negative refractive power and includes a concave surface facing the image side. The first lens, the second lens, the third lens, the fourth lens, and the fifth lens are arranged in order from the object side to the image side along an optical axis. The lens assembly satisfies: $0.10 < D_1/ALD < 0.15$; wherein $D_1$ is an effective optical diameter of the first lens and ALD is a total effective optical diameter of the first lens, the second lens, the third lens, the fourth lens, and the fifth lens.

Referring to Table 1, Table 2, Table 4, Table 5, Table 7, Table 8, Table 10, Table 11, Table 13, and Table 14, wherein Table 1, Table 4, Table 7, Table 10, and Table 13 show optical specifications in accordance with a first, second, third, fourth, and fifth embodiments of the invention respectively and Table 2, Table 5, Table 8, Table 11, and Table 14 show aspheric coefficients of each aspheric surface in Table 1, Table 4, Table 7, Table 10, and Table 13 respectively.

FIG. 1, FIG. 3, FIG. 5, FIG. 7, and FIG. 9 are lens layout and optical path diagrams of the lens assembly in accordance with the first, second, third, fourth, and fifth embodiments of the invention respectively.

The first lens L11, L21, L31, L41, L51 are with positive refractive power and made of glass material, wherein the object side surfaces S12, S22, S32, S42, S52 are convex surfaces and all of the object side surfaces S12, S22, S32, S42, S52 and the image side surfaces S13, S23, S33, S43, S53 are aspheric surfaces.

The second lens L12, L22, L32, L42, L52 are with refractive power and made of plastic material, wherein all of the object side surfaces S14, S24, S34, S44, S54 and the image side surfaces S15, S25, S35, S45, S55 are aspheric surfaces.

The third lens L13, L23, L33, L43, L53 are with negative refractive power and made of plastic material, wherein all of the object side surfaces S16, S26, S36, S46, S56 and the image side surfaces S17, S27, S37, S47, S57 are aspheric surfaces.

The fourth lens L14, L24, L34, L44, L54 are with positive refractive power and made of plastic material, wherein the image side surfaces S19, S29, S39, S49, S59 are convex surfaces and all of the object side surfaces S18, S28, S38, S48, S58 and the image side surfaces S19, S29, S39, S49, S59 are aspheric surfaces.

The fifth lens L15, L25, L35, L45, L55 are with negative refractive power and made of plastic material, wherein the image side surfaces S111, S211, S311, S411, S511 are concave surfaces and all of the object side surfaces S110, S210, S310, S410, S510 and the image side surfaces S111, S211, S311, S411, S511 are aspheric surfaces.

In addition, the lens assembly 1, 2, 3, 4, 5 satisfy at least one of the following conditions:

$2 < TTL/T_1 < 5$; (1)

$61 \times 10^{-6}/° \text{C.} < CTE_1 + CTE_2 < 81 \times 10^{-6}/° \text{C.}$; (2)

$2 \leq f/T_1 < 4$; (3)

$4 < TTL/AAG < 12$; (4)

$1 < T_1/AAG < 4$; (5)

$0.8 < (f_4 + T_1)/f < 2.5$; (6)

$0.10 < D_1/ALD < 0.15$; (7)

$1.5 \leq f/D_1 < 3.5$; (8)

wherein f is an effective focal length of the lens assembly 1, 2, 3, 4, 5 for the first to fifth embodiments, $f_4$ is an effective focal length of the fourth lens L14, L24, L34, L44, L54 for the first to fifth embodiments, TTL is an interval from the object side surface S12, S22, S32, S42, S52 of the first lens L11, L21, L31, L41, L51 to an image plane IMA1, IMA2, IMA3, IMA4, IMA5 along the optical axis OA1, OA2, OA3, OA4, OA5 for the first to fifth embodiments, $T_1$ is a thickness of the first lens L11, L21, L31, L41, L51 along the optical axis OA1, OA2, OA3, OA4, OA5 for the first to fifth embodiments, $CTE_1$ is a coefficient of thermal expansion of the first lens L11, L21, L31, L41, L51 for the first to fifth embodiments, $CTE_2$ is a coefficient of thermal expansion of the second lens L12, L22, L32, L42, L52 for the first to fifth embodiments, AAG is a total air interval from an image side surface S13, S23, S33, S43, S53 of the first lens L11, L21, L31, L41, L51 to an object side surface S110, S210, S310, S410, S510 of the fifth lens L15, L25, L35, L45, L55 which is closest to the image side along the optical axis OA1, OA2, OA3, OA4, OA5 respectively, $D_1$ is an effective optical diameter of the first lens L11, L21, L31, L41, L51 for the first to fifth embodiments, $D_2$ is an effective optical diameter of the second lens L12, L22, L32, L42, L52 for the first to fifth embodiments, $D_3$ is an effective optical diameter of the third lens L13, L23, L33, L43, L53 for the first to fifth embodiments, $D_4$ is an effective optical diameter of the fourth lens L14, L24, L34, L44, L54 for the first to fifth embodiments, $D_5$ is an effective optical diameter of the fifth lens L15, L25, L35, L45, L55 for the first to fifth embodiments, and ALD is a total effective optical diameter of the first lens L11, L21, L31, L41, L51, the second lens L12, L22, L32, L42, L52, the third lens L13, L23, L33, L43, L53, the fourth lens L14, L24, L34, L44, L54, and the fifth lens L15, L25, L35, L45, L55 for the first to fifth embodiments. Making the lens assembly 1, 2, 3, 4, 5 can effectively shorten the total lens length, effectively increase resolution, effectively reduce the effective optical diameter of the lens closest to the object side, and effectively correct aberration.

If the calculated condition value of $CTE_1 + CTE_2$ is greater than or equal to $81 \times 10^{-6}$ then it is difficult to reduce the effective optical diameter of the lens closest to the object side. Therefore, the calculated condition value of $CTE_1 + CTE_2$ needs to be less than $81 \times 10^{-6}$ to effectively reduce the effective optical diameter of the lens closest to the object side. When the condition: $61 \times 10^{-6}/° \text{C.} < CTE_1 + CTE_2 < 81 \times 10^{-6}/° \text{C.}$ is satisfied, the effective optical diameter of the lens closest to the object side can be most effectively reduced.

A detailed description of a lens assembly in accordance with a first embodiment of the invention is as follows. Referring to FIG. 1, the lens assembly 1 includes a stop ST1, a first lens L11, a second lens L12, a third lens L13, a fourth lens L14, a fifth lens L15, and an optical filter OF1, all of which are arranged in order from an object side to an image side along an optical axis OA1. In operation, an image of light rays from the object side is formed at an image plane IMA1.

According to paragraphs [0045]-[0054], wherein: the first lens L11 is a meniscus lens, wherein the image side surface S13 is a concave surface; the second lens L12 is a biconvex lens, wherein the object side surface S14 is a convex surface and the image side surface S15 is a convex surface; the third lens L13 is a meniscus lens, wherein the object side surface S16 is a convex surface and the image side surface S17 is a concave surface; the fourth lens L14 is a meniscus lens, wherein the object side surface S18 is a concave surface; the fifth lens L15 is biconcave lens, wherein the object side surface S110 is a concave surface; and both of the object side surface S112 and image side surface S113 of the optical filter OF1 are plane surfaces.

With the above design of the lenses and stop ST1 and at least any one of the conditions (1)-(8) satisfied, the lens assembly 1 can have an effective shortened total lens length, an effective increased resolution, an effective reduced effective optical diameter of the lens closest to the object side, and is capable of an effective corrected aberration.

Table 1 shows the optical specification of the lens assembly 1 in FIG. 1.

TABLE 1

Effective Focal Length = 4.029 mm F-number = 2.2
Total Lens Length = 5.597 mm Field of View = 77.3 Degrees

| Surface Number | Radius of Curvature (mm) | Thickness (mm) | Nd | Vd | Effective Focal Length (mm) | Remark |
|---|---|---|---|---|---|---|
| S11 | ∞ | −0.14 | | | | Stop ST1 |
| S12 | 2.749 | 1.40 | 1.595 | 67.730 | 7.838 | The First Lens L11 |
| S13 | 5.429 | 0.15 | | | | |
| S14 | 8.554 | 0.49 | 1.531 | 55.830 | 3.118 | The Second Lens L12 |
| S15 | −2.023 | 0.03 | | | | |
| S16 | 2.922 | 0.23 | 1.660 | 20.400 | −5.238 | The Third Lens L13 |
| S17 | 1.540 | 0.51 | | | | |
| S18 | −3.235 | 0.76 | 1.660 | 20.400 | 3.660 | The Fourth Lens L14 |
| S19 | −1.522 | 0.16 | | | | |
| S110 | −15.607 | 0.92 | 1.660 | 20.400 | −2.317 | The Fifth Lens L15 |
| S111 | 1.755 | 0.30 | | | | |
| S112 | ∞ | 0.21 | 1.516 | 64.19 | | Optical Filter OF1 |
| S113 | ∞ | 0.43 | | | | |

The aspheric surface sag z of each aspheric surface in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20}$$

where c is curvature, h is the vertical distance from the lens surface to the optical axis, k is conic constant and A, B, C, D, E, F, G, H and I are aspheric coefficients.

In the first embodiment, the conic constant k and the aspheric coefficients A, B, C, D, E, F, G, H, I of each aspheric surface are shown in Table 2.

TABLE 2

| Surface Number | k | A | B | C | D | |
|---|---|---|---|---|---|---|
| | | E | F | G | H | I |
| S12 | 2.23E+00 | −1.34E−02 | −1.06E−01 | 4.01E−01 | −9.16E−01 | |
| | | 1.17E+00 | −7.79E−01 | 2.12E−01 | 0 | 0 |
| S13 | −9.32E+01 | 1.54E−02 | −8.56E−02 | −5.47E−03 | 3.12E−01 | |
| | | −7.03E−01 | 1.07E+00 | −6.19E−01 | 0 | 0 |
| S14 | 0.00E+00 | −3.75E−02 | −3.13E−01 | 1.03E+00 | −2.36E+00 | |
| | | 3.35E+00 | −2.11E+00 | 4.25E−01 | 0 | 0 |

TABLE 2-continued

| Surface Number | k | A | B | C | D | |
|---|---|---|---|---|---|---|
| | | E | F | G | H | I |
| S15 | 0.00E+00 | −8.40E−02 | 3.38E−02 | 1.47E−01 | −8.64E−01 | |
| | | 1.68E+00 | −1.33E+00 | 3.98E−01 | 0 | 0 |
| S16 | 0.00E+00 | −3.17E−01 | 6.28E−01 | −1.42E+00 | 2.31E+00 | |
| | | −2.32E+00 | 1.27E+00 | −2.96E−01 | 0 | 0 |
| S17 | −1.05E+01 | 1.27E−02 | −5.35E−02 | 7.18E−02 | −2.65E−02 | |
| | | −2.57E−02 | 2.45E−02 | −6.11E−03 | 0 | 0 |
| S18 | 0.00E+00 | 4.82E−03 | 1.15E−02 | −1.04E−01 | 2.00E−01 | |
| | | −1.57E−01 | 6.11E−02 | −9.95E−03 | 0 | 0 |
| S19 | −6.02E−01 | −4.54E−02 | 9.03E−02 | −9.15E−02 | 5.22E−02 | |
| | | −1.43E−02 | 3.27E−03 | −5.44E−04 | 0 | 0 |
| S110 | 6.46E+01 | −2.25E−01 | 1.46E−01 | −6.24E−02 | 1.09E−02 | |
| | | 3.08E−03 | −1.46E−03 | 1.53E−04 | 0 | 0 |
| S111 | −7.65E+00 | −8.02E−02 | 3.74E−02 | −1.21E−02 | 2.44E−03 | |
| | | −3.04E−04 | 2.16E−05 | −6.82E−07 | 0 | 0 |

Table 3 shows the parameters and condition values for conditions (1)-(8) in accordance with the first embodiment of the invention. It can be seen from Table 3 that the lens assembly 1 of the first embodiment satisfies the conditions (1)-(8).

TABLE 3

| $CTE_1$ | $11.7 \times 10^{-6}/°$ C. | $CTE_2$ | $59 \times 10^{-6}/°$ C. | $D_1$ | 1.826 mm |
| $D_2$ | 1.962 mm | $D_3$ | 2.698 mm | $D_4$ | 3.134 mm |
| $D_5$ | 5.68 mm | ALD | 15.3 mm | AAG | 0.85 mm |
| $TTL/T_1$ | 4.00 | $CTE_1 + CTE_2$ | $70.7 \times 10^{-6}/°$ C. | $f/T_1$ | 2.88 |
| TTL/AAG | 6.58 | $T_1$/AAG | 1.65 | $(f_4 + T_1)/f$ | 1.26 |
| $D_1$/ALD | 0.12 | $f/D_1$ | 2.21 | | |

Figure 2A:
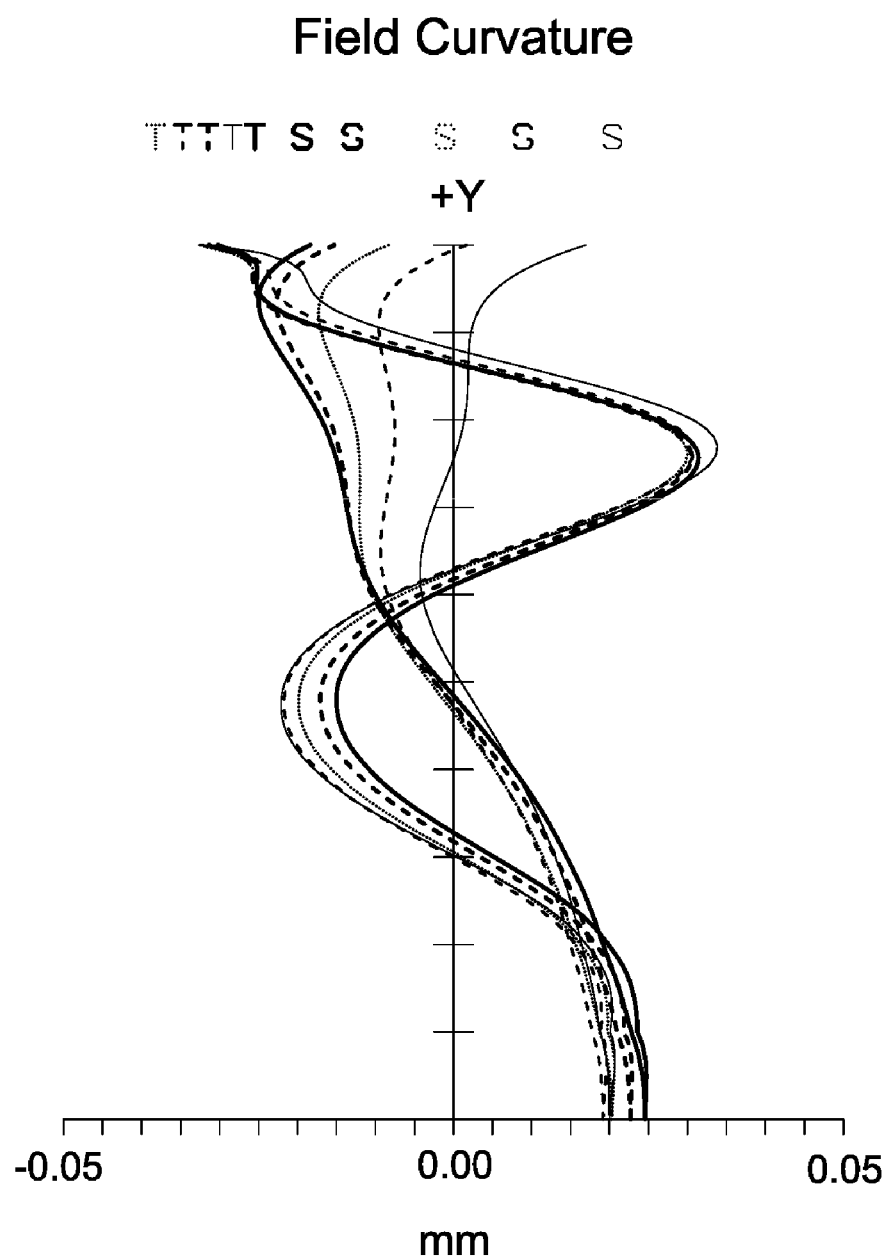
FIG. 2A depicts a field curvature diagram of the lens assembly in accordance with the first embodiment of the invention.
Figure 2B:
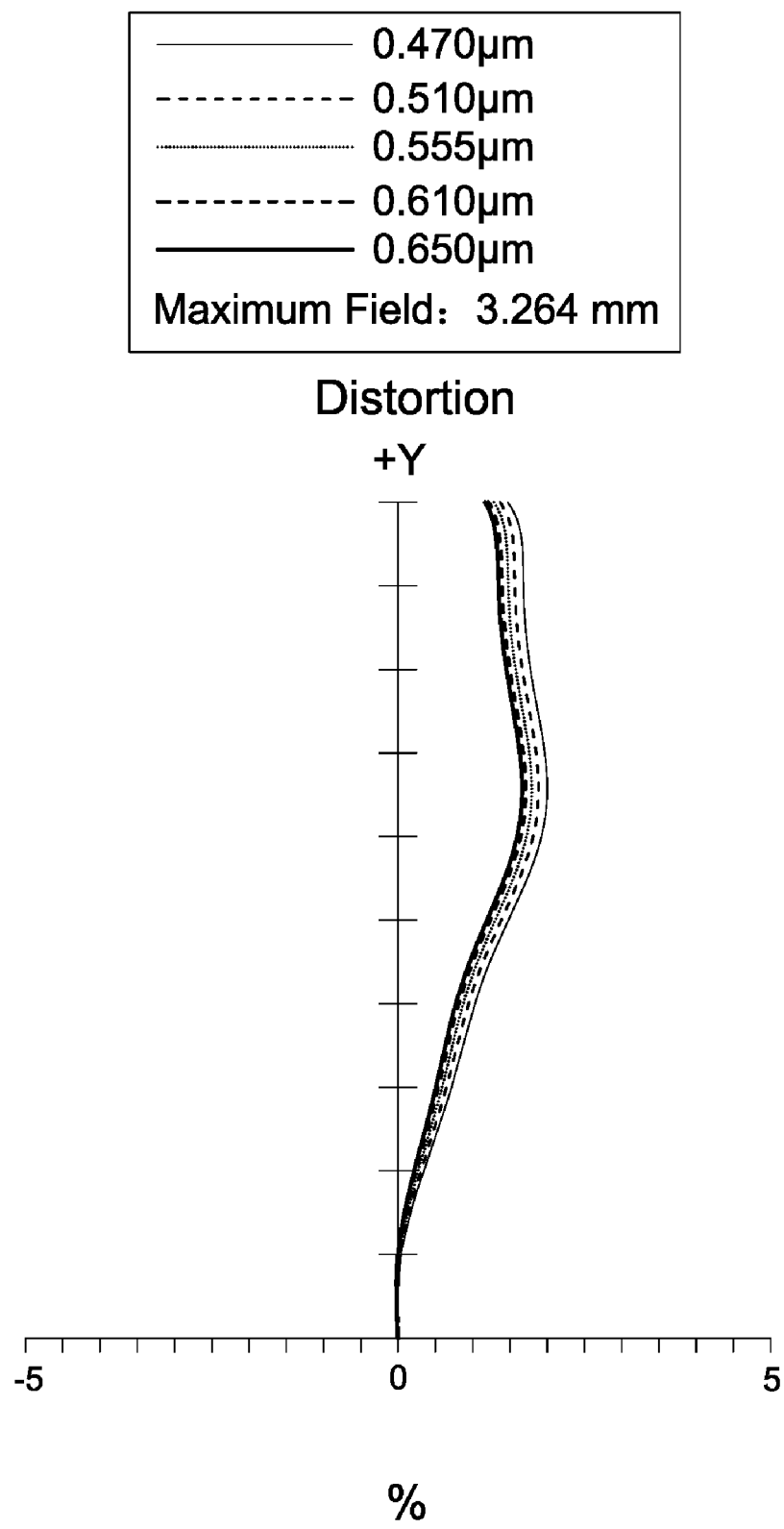
FIG. 2B is a distortion diagram of the lens assembly in accordance with the first embodiment of the invention.
Figure 2C:
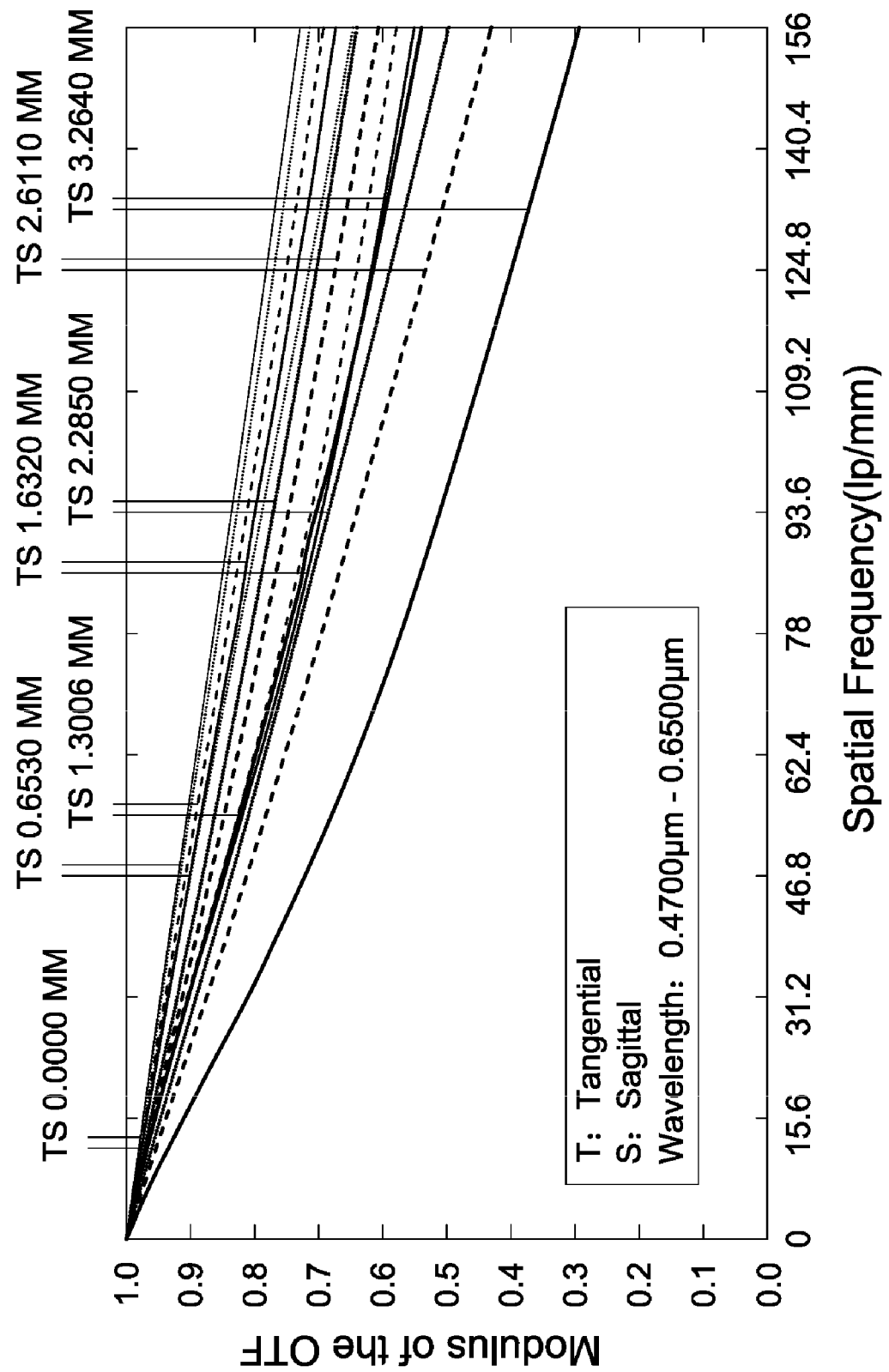
FIG. 2C is a modulation transfer function diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a field curvature diagram of the lens assembly 1 in accordance with the first embodiment of the invention, FIG. 2B shows a distortion diagram of the lens assembly 1 in accordance with the first embodiment of the invention, and FIG. 2C shows a modulation transfer function diagram of the lens assembly 1 in accordance with the first embodiment of the invention.

It can be seen from FIG. 2A that the field curvature of tangential direction and sagittal direction in the lens assembly 1 of the first embodiment ranges from −0.035 mm to 0.035 mm.

It can be seen from FIG. 2B that the distortion in the lens assembly 1 of the first embodiment ranges from 0% to 2%.

It can be seen from FIG. 2C that the modulation transfer function of tangential direction and sagittal direction in the lens assembly 1 of the first embodiment ranges from 0.30 to 1.0.

It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Figure 3:
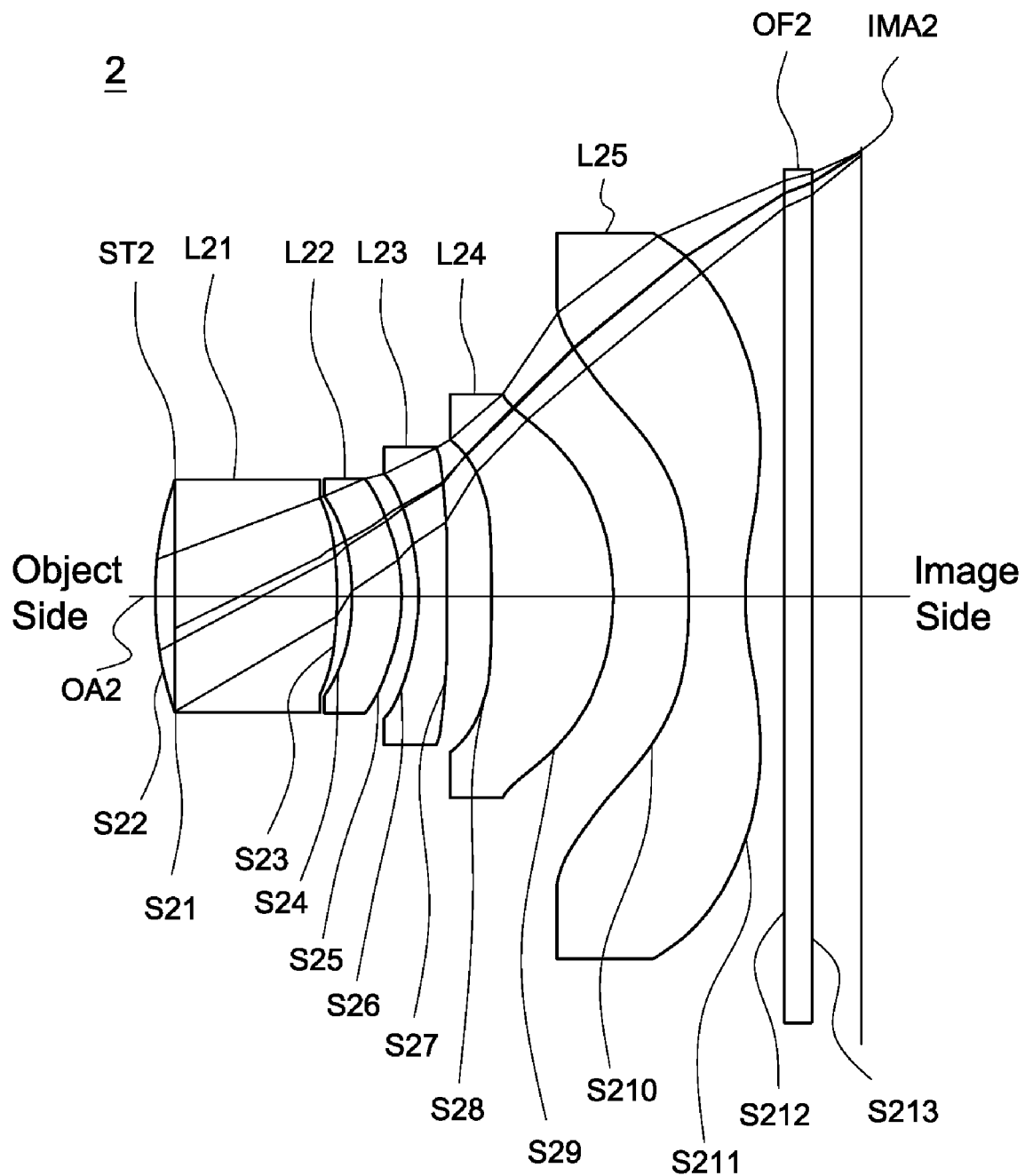
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a stop ST2, a first lens L21, a second lens L22, a third lens L23, a fourth lens L24, a fifth lens L25, and an optical filter OF2, all of which are arranged in order from an object side to an image side along an optical axis OA2. In operation, an image of light rays from the object side is formed at an image plane IMA2.

According to paragraphs [0045]-[0054], wherein: the first lens L21 is a biconvex lens, wherein the image side surface S23 is a convex surface; the second lens L22 is a meniscus lens, wherein the object side surface S24 is a concave surface and the image side surface S25 is a convex surface; the third lens L23 is a biconcave lens, wherein the object side surface S26 is a concave surface and the image side surface S27 is a concave surface; the surface profiles of the fourth lens L24 approximate to that of the fourth lens L14 of the lens assembly 1 of the first embodiment, and is not described here again; the fifth lens L25 is a biconcave lens and the surface profiles of the fifth lens L25 approximate to that of the fifth lens L15 of the lens assembly 1 of the first embodiment, and is not described here again, and both of the object side surface S212 and image side surface S213 of the optical filter OF2 are plane surfaces.

With the above design of the lenses and stop ST2 and at least any one of the conditions (1)-(8) satisfied, the lens assembly 2 can have an effective shortened total lens length, an effective increased resolution, an effective reduced effective optical diameter of the lens closest to the object side, and is capable of an effective corrected aberration.

Table 4 shows the optical specification of the lens assembly 2 in FIG. 3.

TABLE 4

Effective Focal Length = 4.029 mm F-number = 2.2
Total Lens Length = 5.442 mm Field of View = 77.25 Degrees

| Surface Number | Radius of Curvature (mm) | Thickness (mm) | Nd | Vd | Effective Focal Length (mm) | Remark |
|---|---|---|---|---|---|---|
| S21 | ∞ | −0.14 | | | | Stop ST2 |
| S22 | 2.541 | 1.40 | 1.595 | 67.730 | 2.9 | The First Lens L21 |
| S23 | −4.314 | 0.12 | | | | |
| S24 | −2.117 | 0.38 | 1.531 | 55.830 | 6.365 | The Second Lens L22 |
| S25 | −1.390 | 0.13 | | | | |
| S26 | −1.954 | 0.22 | 1.660 | 20.400 | −2.608 | The Third Lens L23 |
| S27 | 16.398 | 0.35 | | | | |

TABLE 4-continued

Effective Focal Length = 4.029 mm F-number = 2.2
Total Lens Length = 5.442 mm Field of View = 77.25 Degrees

| Surface Number | Radius of Curvature (mm) | Thickness (mm) | Nd | Vd | Effective Focal Length (mm) | Remark |
|---|---|---|---|---|---|---|
| S28 | −29.006 | 0.94 | 1.660 | 20.400 | 2.829 | The Fourth Lens L24 |
| S29 | −1.793 | 0.58 | | | | |
| S210 | −4.883 | 0.44 | 1.660 | 20.400 | −2.292 | The Fifth Lens L25 |
| S211 | 2.303 | 0.30 | | | | |
| S212 | ∞ | 0.21 | 1.516 | 64.19 | | Optical Filter OF2 |
| S213 | ∞ | 0.38 | | | | |

The definition of aspheric surface sag z of each aspheric surface in table 4 is the same as that of in Table 1, and is not described here again.

In the second embodiment, the conic constant k and the aspheric coefficients A, B, C, D, E, F, G, H, I of each aspheric surface are shown in Table 5.

TABLE 5

| Surface Number | k | A | B | C | D |
|---|---|---|---|---|---|
| | | E | F | G | H    I |
| S22 | 2.57E−02 | −2.28E−02 | 8.70E−02 | −4.10E−01 | 9.40E−01 |
| | | −1.20E+00 | 7.93E−01 | −2.15E−01 | 0    0 |
| S23 | 1.95E+01 | −1.49E−01 | −1.22E−01 | 8.30E−01 | −2.65E+00 |
| | | 5.08E+00 | −4.72E+00 | 1.60E+00 | 0    0 |
| S24 | 0.00E+00 | −2.43E−01 | 2.21E−02 | 2.00E−01 | −8.30E−02 |
| | | −5.24E−02 | 4.65E−01 | −7.82E−01 | 0    0 |
| S25 | −4.11E+00 | −6.76E−02 | 3.68E−02 | 2.62E−02 | −6.41E−02 |
| | | −4.28E−03 | −9.04E−03 | −4.51E−02 | 0    0 |
| S26 | 0.00E+00 | −2.02E−02 | 9.66E−02 | 5.23E−03 | −2.02E−01 |
| | | 6.48E−02 | 1.34E−01 | −1.37E−01 | 0    0 |
| S27 | −3.30E+03 | −1.46E−01 | 1.08E−01 | 2.52E−02 | −5.46E−02 |
| | | −1.54E−03 | 1.85E−02 | −7.16E−03 | 0    0 |
| S28 | 5.62E+02 | −1.01E−01 | 9.76E−03 | −7.48E−02 | 3.47E−02 |
| | | 2.54E−02 | −1.57E−02 | −1.57E−04 | 0    0 |
| S29 | −1.36E−02 | 4.39E−02 | −5.01E−02 | 7.25E−03 | 2.74E−03 |
| | | −3.74E−04 | −3.66E−04 | 2.34E−04 | 0    0 |
| S210 | −5.10E+01 | −1.26E−01 | −7.74E−03 | 1.52E−02 | 9.22E−04 |
| | | −1.94E−03 | 4.05E−04 | −2.65E−05 | 0    0 |
| S211 | 0.00E+00 | −1.14E−01 | 3.49E−02 | −5.36E−03 | −2.23E−05 |
| | | 1.37E−04 | −1.85E−05 | 7.89E−07 | 0    0 |

Table 6 shows the parameters and condition values for conditions (1)-(8) in accordance with the second embodiment of the invention. It can be seen from Table 6 that the lens assembly 2 of the second embodiment satisfies the conditions (1)-(8).

TABLE 6

| $CTE_1$ | 11.7 × 10$^{-6}$/° C. | $CTE_2$ | 61 × 10$^{-6}$/° C. | $D_1$ | 1.8 mm |
|---|---|---|---|---|---|
| $D_2$ | 1.816 mm | $D_3$ | | 2.304 mm | $D_4$ | 3.12 mm |
| $D_5$ | 5.616 mm | ALD | | 14.656 mm | AAG | 1.18 mm |
| $TTL/T_1$ | 3.89 | $CTE_1 + CTE_2$ | 72.7 × 10$^{-6}$/° C. | $f/T_1$ | 2.88 |
| TTL/AAG | 4.61 | $T_1$/AAG | | 1.19 | $(f_4 + T_1)/f$ | 1.05 |
| $D_1$/ALD | 0.12 | $f/D_1$ | | 2.24 | | |

Figure 4A:
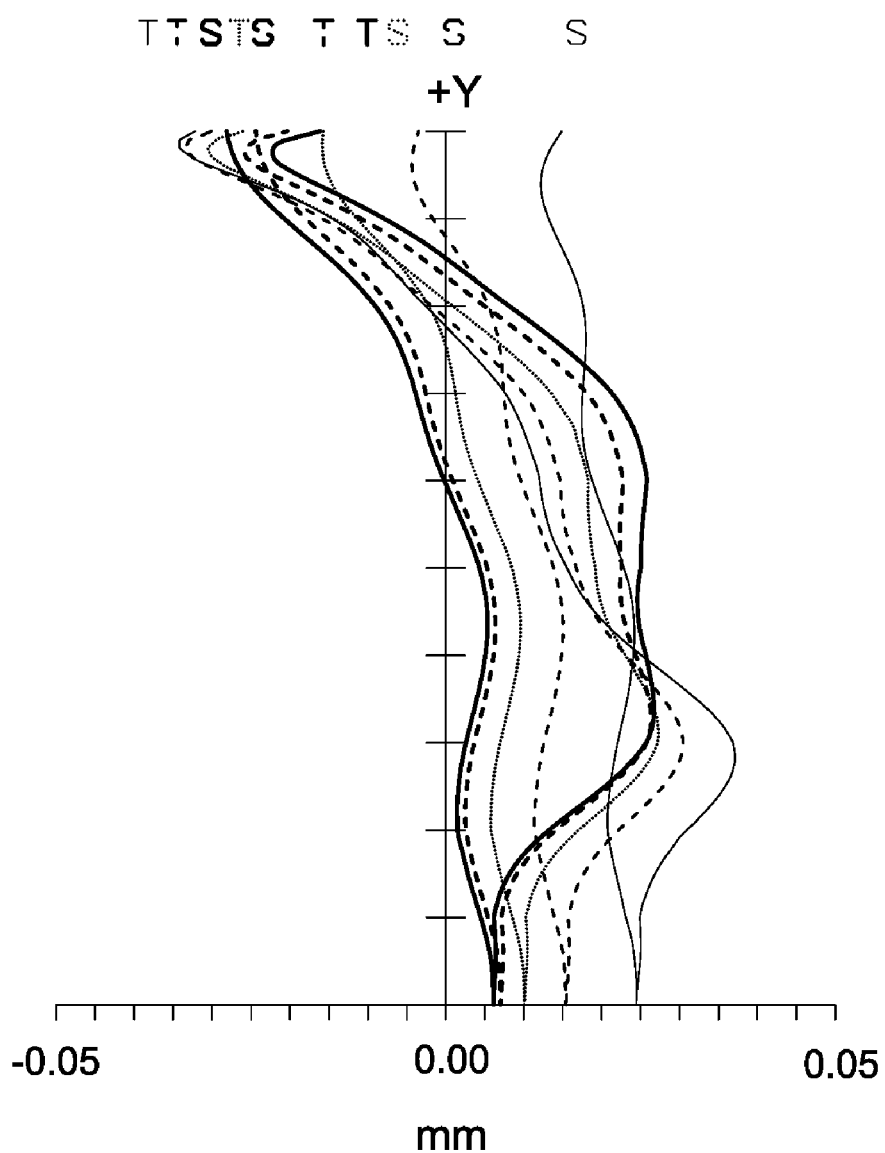
FIG. 4A depicts a field curvature diagram of the lens assembly in accordance with the second embodiment of the invention.
Figure 4B:
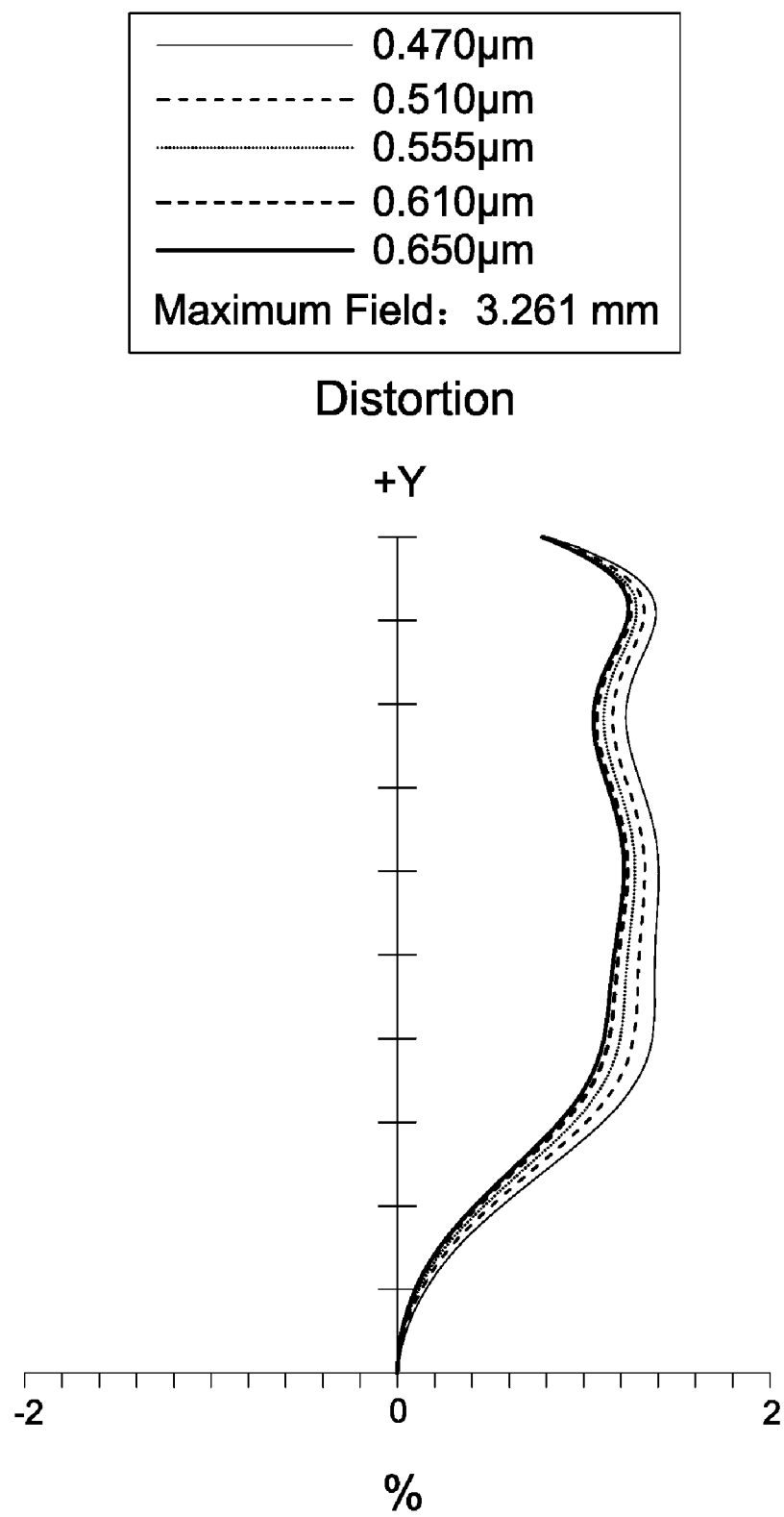
FIG. 4B is a distortion diagram of the lens assembly in accordance with the second embodiment of the invention.
Figure 4C:
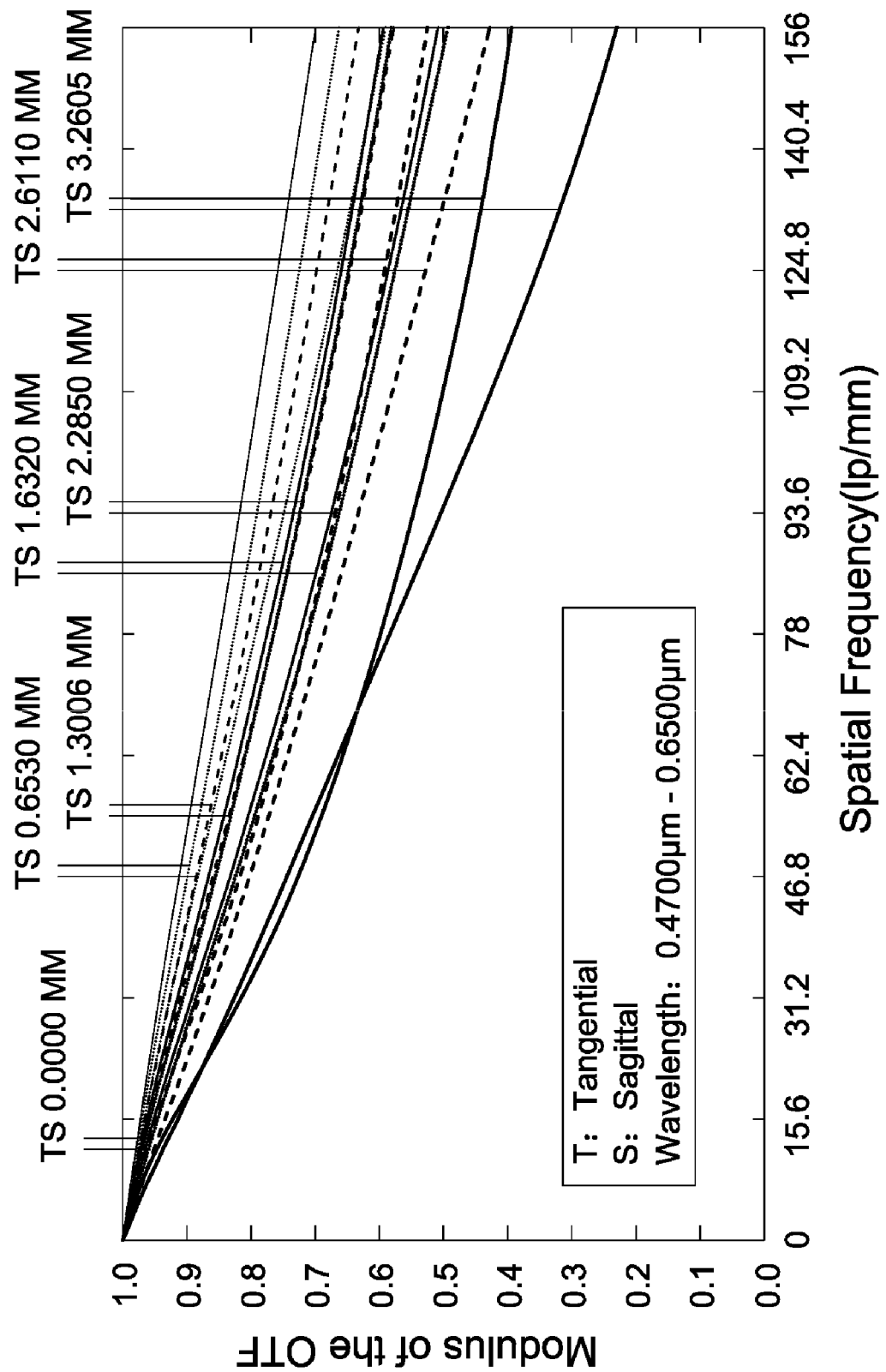
FIG. 4C is a modulation transfer function diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a field curvature diagram of the lens assembly 2 in accordance with the second embodiment of the invention, FIG. 4B shows a distortion diagram of the lens assembly 2 in accordance with the second embodiment of the invention, and FIG. 4C shows a modulation transfer function diagram of the lens assembly 2 in accordance with the second embodiment of the invention.

It can be seen from FIG. 4A that the field curvature of tangential direction and sagittal direction in the lens assembly 2 of the second embodiment ranges from −0.035 mm to 0.04 mm.

It can be seen from FIG. 4B that the distortion in the lens assembly 2 of the second embodiment ranges from 0% to 1.4%.

It can be seen from FIG. 4C that the modulation transfer function of tangential direction and sagittal direction in the lens assembly 2 of the second embodiment ranges from 0.23 to 1.0.

It is obvious that the field curvature and the distortion of the lens assembly 2 of the second embodiment can be corrected effectively, and the resolution of the lens assembly 2 of the second embodiment can meet the requirement. Therefore, the lens assembly 2 of the second embodiment is capable of good optical performance.

Figure 5:
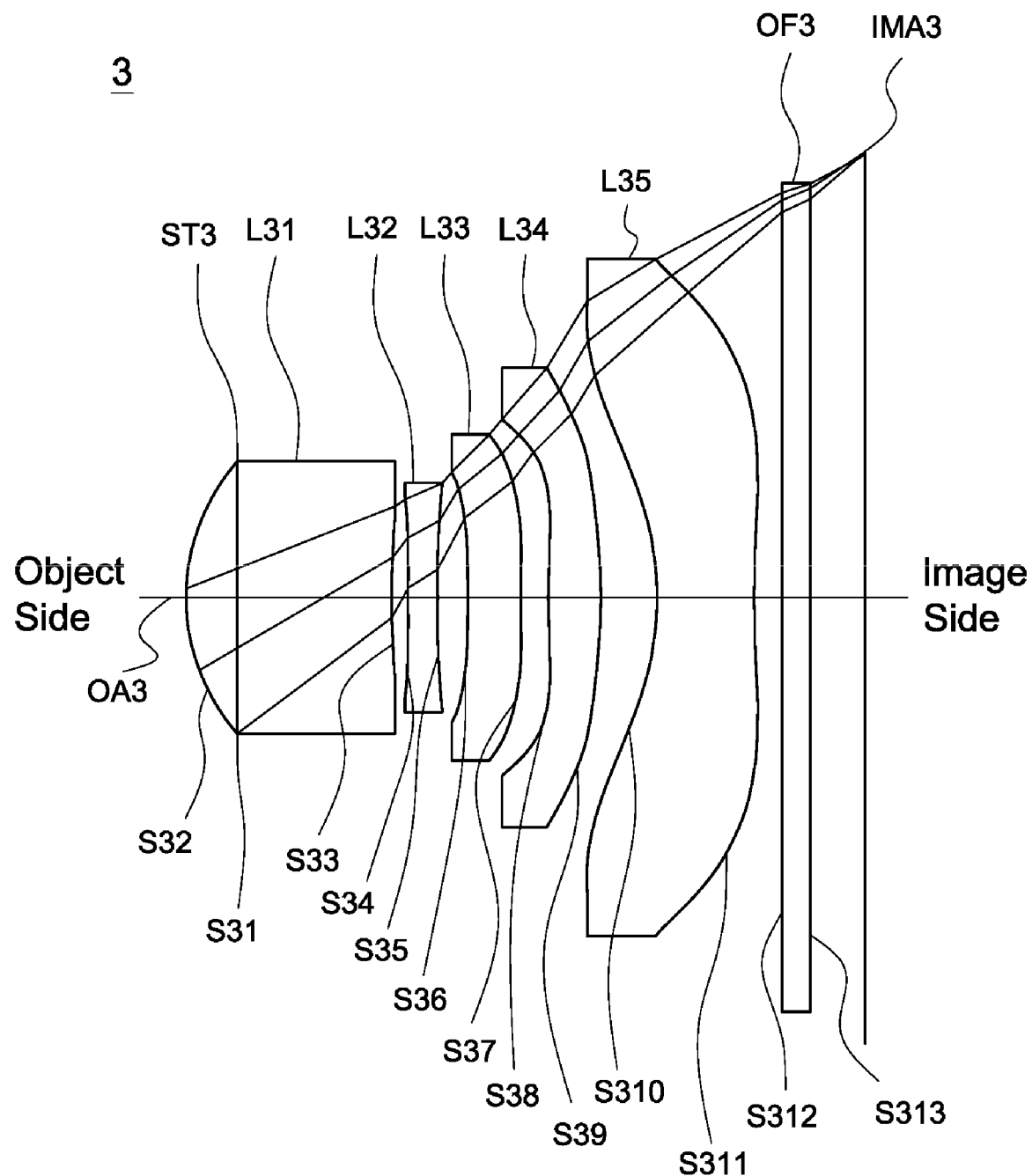
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a stop ST3, a first lens L31, a second lens L32, a third lens L33, a fourth lens L34, a fifth lens L35, and an optical filter OF3, all of which are arranged in order from an object side to an image side along an optical axis OA3. In operation, an image of light rays from the object side is formed at an image plane IMA3.

According to paragraphs [0045]-[0054], wherein: the surface profiles of the first lens L31 approximate to that of the first lens L11 of the lens assembly 1 of the first embodiment, and is not described here again; the second lens L32 is a biconcave lens, wherein the object side surface S34 is a concave surface and the image side surface S35 is a concave surface; the third lens L33 is a biconcave surface, wherein the object side surface S36 is a concave surface and the image side surface S37 is a concave surface; the fourth lens L34 is a biconvex lens, wherein the object side surface S38 is a convex surface; the fifth lens L35 is a biconcave lens and the surface profiles of the fifth lens L35 approximate to that of the fifth lens L15 of the lens assembly 1 of the first embodiment, and is not described here again, and both of the object side surface S312 and image side surface S313 of the optical filter OF3 are plane surfaces.

With the above design of the lenses and stop ST3 and at least any one of the conditions (1)-(8) satisfied, the lens assembly 3 can have an effective shortened total lens length, an effective increased resolution, an effective reduced effective optical diameter of the lens closest to the object side, and is capable of an effective corrected aberration.

Table 7 shows the optical specification of the lens assembly 3 in FIG. 5.

TABLE 7

Effective Focal Length = 4.597 mm F-number = 2.2
Total Lens Length = 4.958 mm Field of View = 69 Degrees

| Surface Number | Radius of Curvature (mm) | Thickness (mm) | Nd | Vd | Effective Focal Length (mm) | Remark |
|---|---|---|---|---|---|---|
| S31 | ∞ | −0.367 | | | | Stop ST3 |
| S32 | 1.494 | 1.50 | 1.496 | 81.610 | 3.595 | The First Lens L31 |
| S33 | 5.994 | 0.12 | | | | |
| S34 | −57.463 | 0.22 | 1.660 | 20.400 | −22.76 | The Second Lens L32 |
| S35 | 20.636 | 0.22 | | | | |
| S36 | −14.218 | 0.39 | 1.660 | 20.400 | −9.682 | The Third Lens L33 |
| S37 | 11.940 | 0.20 | | | | |
| S38 | 6.829 | 0.38 | 1.582 | 30.182 | 4.413 | The Fourth Lens L34 |
| S39 | −4.076 | 0.41 | | | | |
| S310 | −2.272 | 0.71 | 1.535 | 56.115 | −3.144 | The Fifth Lens L35 |
| S311 | 7.285 | 0.20 | | | | |
| S312 | ∞ | 0.21 | 1.516 | 64.19 | | Optical Filter OF3 |
| S313 | ∞ | 0.40 | | | | |

The definition of aspheric surface sag z of each aspheric surface in table 7 is the same as that of in Table 1, and is not described here again.

In the third embodiment, the conic constant k and the aspheric coefficients A, B, C, D, E, F, G, H, I of each aspheric surface are shown in Table 8.

TABLE 8

| Surface Number | k | A | B | C | D |
|---|---|---|---|---|---|
| | | E | F | G | H | I |
| S32 | −1.99E−01 | −6.77E−03 | 4.88E−02 | −1.18E−01 | 1.27E−01 |
| | | −3.47E−02 | −3.46E−02 | 1.94E−02 | 0 | 0 |
| S33 | 6.11E+01 | −6.88E−02 | 3.21E−02 | −3.17E−01 | −3.46E−01 |
| | | 6.01E−01 | 1.11E+00 | −2.92E+00 | 0 | 0 |
| S34 | −7.51E+02 | −9.79E−03 | 7.85E−02 | −3.61E−01 | −3.35E−02 |
| | | 1.08E−02 | 3.99E−01 | −1.84E−01 | 0 | 0 |
| S35 | −8.86E+03 | 8.09E−02 | −4.23E−02 | 1.61E−01 | −5.91E−01 |
| | | 7.24E−01 | −2.81E−01 | 1.27E−03 | 0 | 0 |
| S36 | 2.29E+02 | −1.94E−01 | 1.94E−01 | 9.80E−02 | −1.22E−01 |
| | | −9.51E−01 | 1.67E+00 | −8.24E−01 | 0 | 0 |
| S37 | −1.02E+03 | −2.39E−01 | 1.33E−01 | 2.27E−02 | −8.15E−02 |
| | | 2.60E−02 | 5.76E−03 | −3.36E−03 | 0 | 0 |
| S38 | −1.49E+02 | −6.88E−02 | −8.40E−02 | 5.45E−02 | −1.05E−02 |
| | | −2.46E−02 | 1.60E−02 | −2.32E−03 | 0 | 0 |
| S39 | 1.12E+00 | 8.98E−02 | −7.58E−02 | 1.84E−02 | −2.39E−03 |
| | | 1.15E−03 | −1.84E−04 | −1.85E−05 | 0 | 0 |
| S310 | −6.78E+00 | −7.46E−02 | 4.60E−02 | −1.12E−02 | 1.52E−03 |
| | | −1.34E−04 | 9.80E−06 | −4.49E−07 | 0 | 0 |
| S311 | 0.00E+00 | −6.23E−02 | 1.64E−02 | −4.87E−03 | 7.11E−04 |
| | | 4.89E−06 | −1.42E−05 | 1.19E−06 | 0 | 0 |

Table 9 shows the parameters and condition values for conditions (1)-(8) in accordance with the third embodiment of the invention. It can be seen from Table 9 that the lens assembly 3 of the third embodiment satisfies the conditions (1)-(8).

TABLE 9

| | | | | | |
|---|---|---|---|---|---|
| $CTE_1$ | 14.5 × 10⁻⁶/° C. | $CTE_2$ | 60 × 10⁻⁶/° C. | $D_1$ | 2 mm |
| $D_2$ | 1.746 mm | $D_3$ | 2.432 mm | $D_4$ | 3.476 mm |
| $D_5$ | 5.116 mm | ALD | 14.77 mm | AAG | 0.95 mm |
| $TTL/T_1$ | 3.31 | $CTE_1 + CTE_2$ | 74.5 × 10⁻⁶/° C. | $f/T_1$ | 3.06 |
| TTL/AAG | 5.22 | $T_1$/AAG | 1.58 | $(f_4 + T_1)/f$ | 1.29 |
| $D_1$/ALD | 0.14 | $f/D_1$ | 2.30 | | |

Figure 6A:
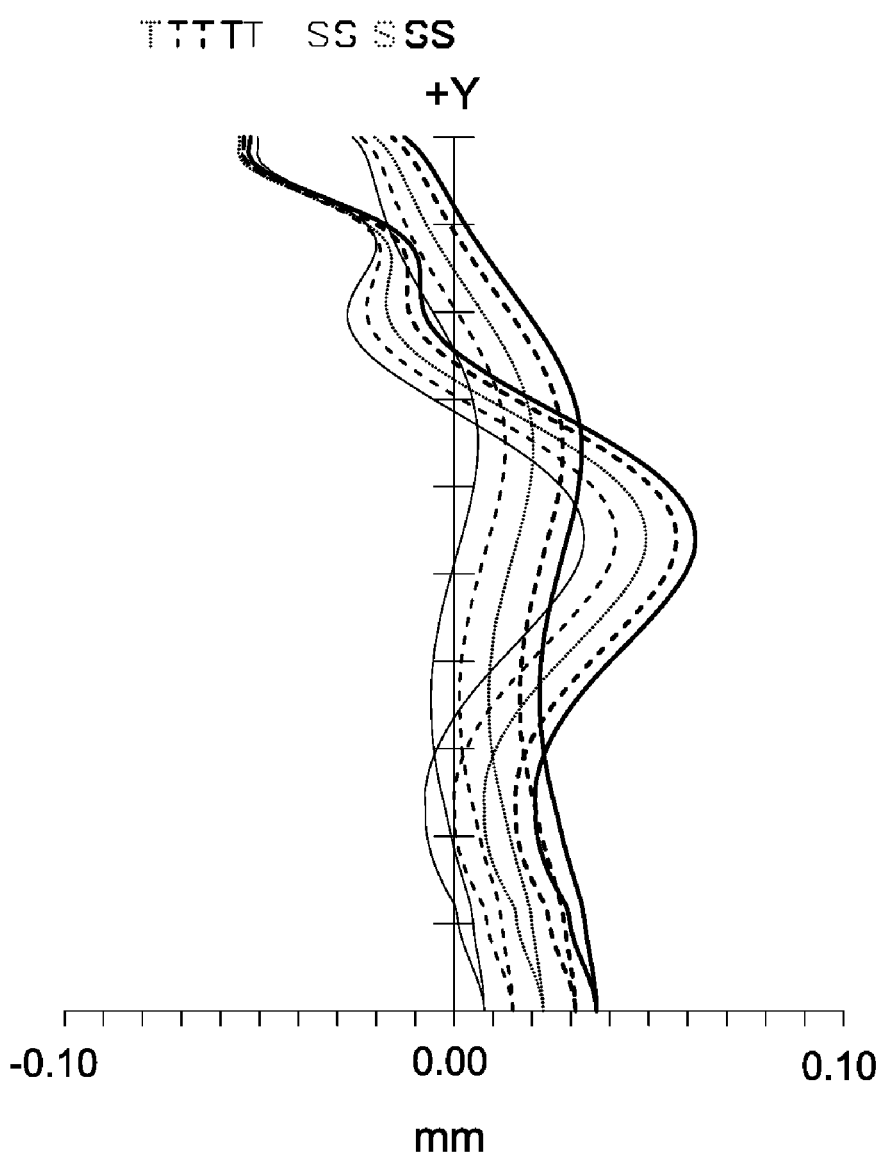
FIG. 6A depicts a field curvature diagram of the lens assembly in accordance with the third embodiment of the invention.
Figure 6B:
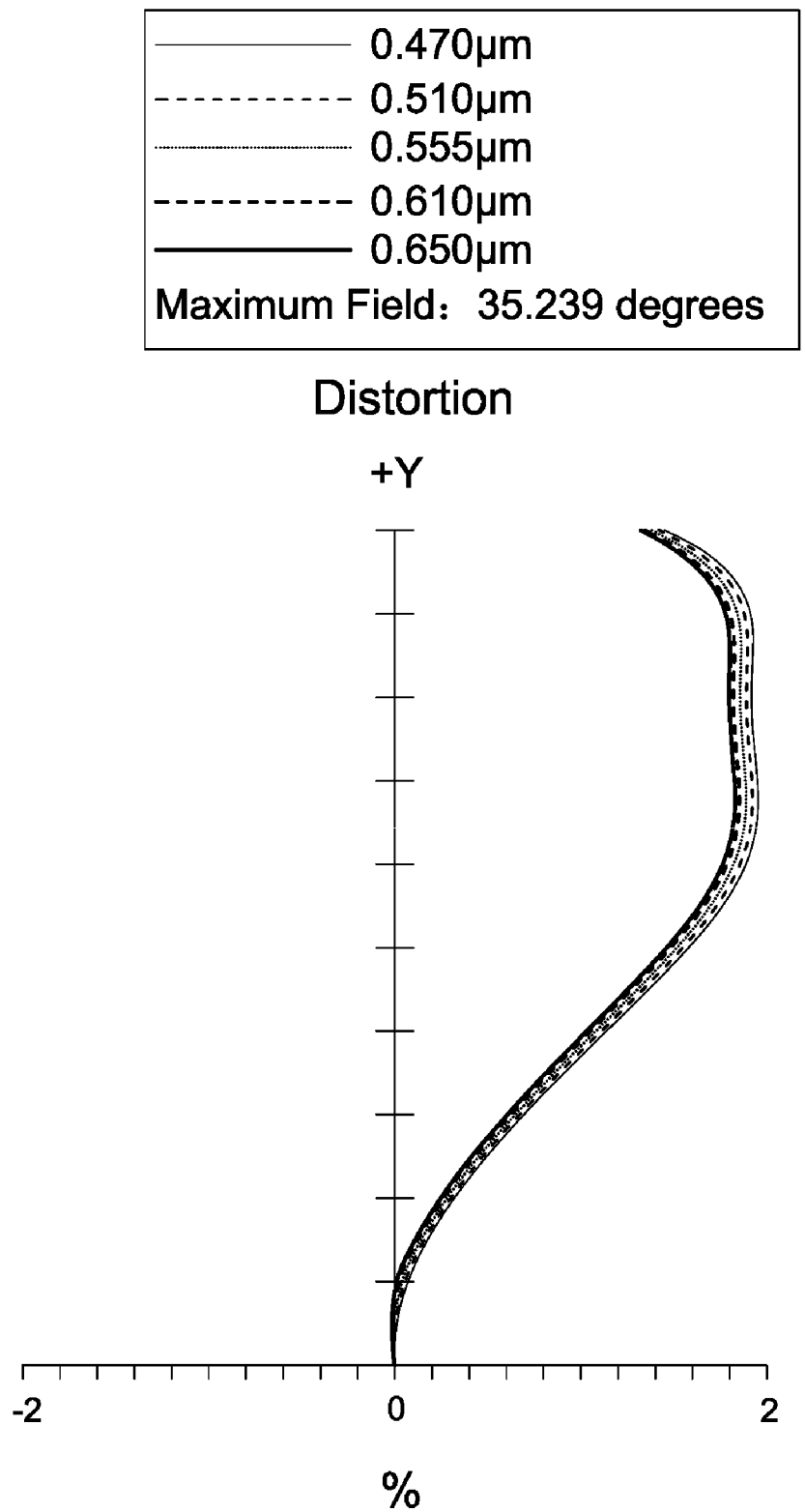
FIG. 6B is a distortion diagram of the lens assembly in accordance with the third embodiment of the invention.
Figure 6C:
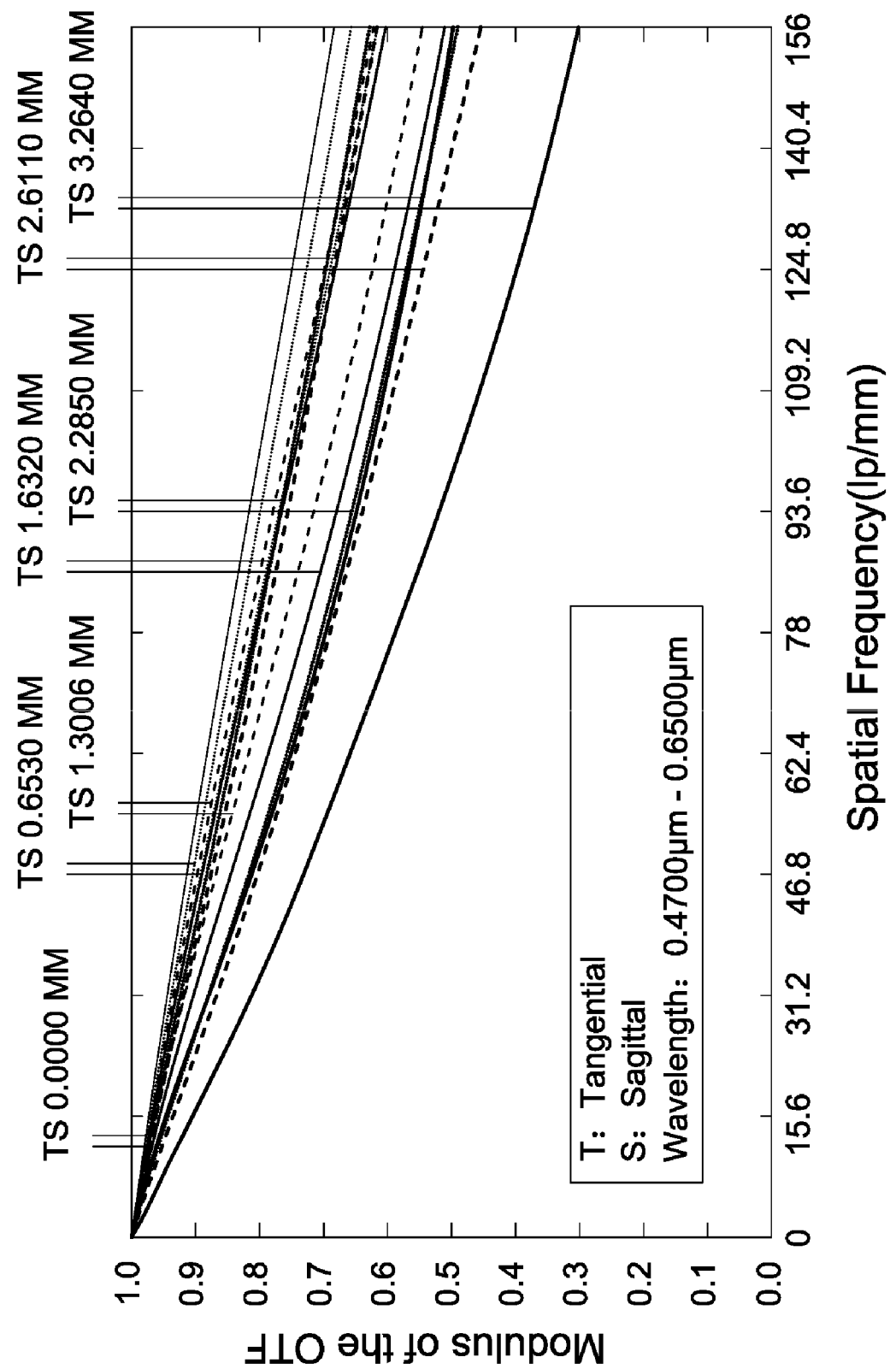
FIG. 6C is a modulation transfer function diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a field curvature diagram of the lens assembly 3 in accordance with the third embodiment of the invention, FIG. 6B shows a distortion diagram of the lens assembly 3 in accordance with the third embodiment of the invention, and FIG. 6C shows a modulation transfer function diagram of the lens assembly 3 in accordance with the third embodiment of the invention.

It can be seen from FIG. 6A that the field curvature of tangential direction and sagittal direction in the lens assembly 3 of the third embodiment ranges from −0.06 mm to 0.07 mm.

It can be seen from FIG. 6B that the distortion in the lens assembly 3 of the third embodiment ranges from 0% to 2%.

It can be seen from FIG. 6C that the modulation transfer function of tangential direction and sagittal direction in the lens assembly 3 of the third embodiment ranges from 0.30 to 1.0.

It is obvious that the field curvature and the distortion of the lens assembly 3 of the third embodiment can be corrected effectively, and the resolution of the lens assembly 3 of the third embodiment can meet the requirement. Therefore, the lens assembly 3 of the third embodiment is capable of good optical performance.

Figure 7:
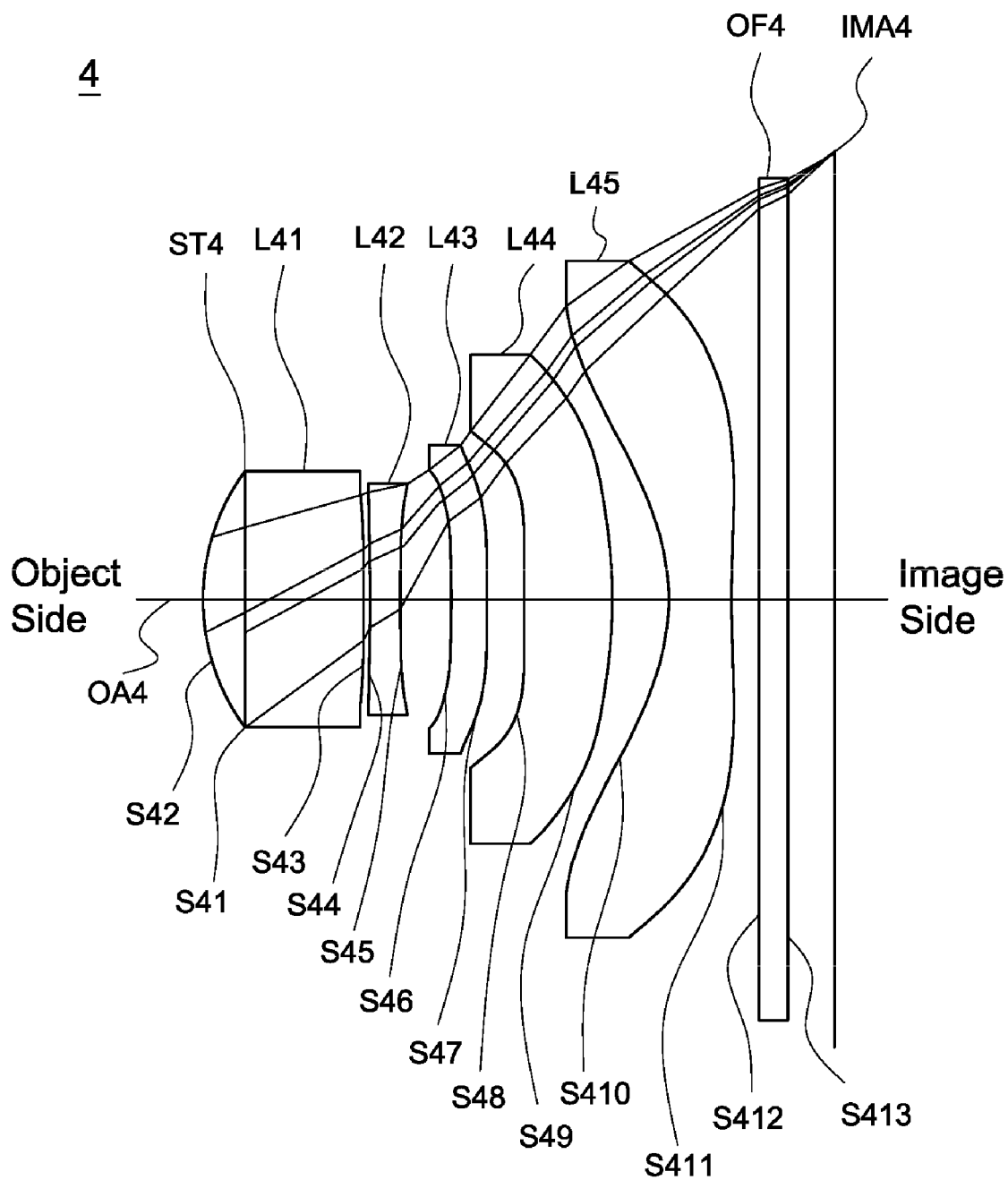
FIG. 7 is a lens layout and optical path diagram of a lens assembly in accordance with a fourth embodiment of the invention.

Referring to FIG. 7, FIG. 7 is a lens layout and optical path diagram of a lens assembly in accordance with a fourth embodiment of the invention. The lens assembly 4 includes a stop ST4, a first lens L41, a second lens L42, a third lens L43, a fourth lens L44, a fifth lens L45, and an optical filter OF4, all of which are arranged in order from an object side to an image side along an optical axis OA4. In operation, an image of light rays from the object side is formed at an image plane IMA4.

According to paragraphs [0045]-[0054], wherein: the surface profiles of the first lens L41 approximate to that of the first lens L11 of the lens assembly 1 of the first embodiment, and is not described here again; the second lens L42 is a biconcave lens, wherein the object side surface S44 is a concave surface and the image side surface S45 is a concave surface; the third lens L43 is a biconcave lens, wherein the object side surface S46 is a concave surface and the image side surface S47 is a concave surface; the fourth lens L44 is a biconvex lens, wherein the object side surface S48 is a convex surface; the fifth lens L45 is a biconcave lens and the surface profiles of the fifth lens L45 approximate to that of the fifth lens L15 of the lens assembly 1 of the first embodiment, and is not described here again, and both of the object side surface S412 and image side surface S413 of the optical filter OF4 are plane surfaces.

With the above design of the lenses and stop ST4 and at least any one of the conditions (1)-(8) satisfied, the lens assembly 4 can have an effective shortened total lens length, an effective increased resolution, an effective reduced effective optical diameter of the lens closest to the object side, and is capable of an effective corrected aberration.

Table 10 shows the optical specification of the lens assembly 4 in FIG. 7.

TABLE 10

Effective Focal Length = 4.113 mm F-number = 2.2
Total Lens Length = 4.59 mm Field of View = 75.5 Degrees

| Surface Number | Radius of Curvature (mm) | Thickness (mm) | Nd | Vd | Effective Focal Length (mm) | Remark |
|---|---|---|---|---|---|---|
| S41 | ∞ | −0.397 | | | | Stop ST4 |
| S42 | 1.714 | 1.17 | 1.496 | 81.610 | 3.091 | The First Lens L41 |
| S43 | 67.328 | 0.05 | | | | |
| S44 | −16.495 | 0.22 | 1.660 | 20.400 | −15.994 | The Second Lens L42 |
| S45 | 30.277 | 0.37 | | | | |
| S46 | −33.133 | 0.26 | 1.660 | 20.400 | −21.917 | The Third Lens L43 |
| S47 | 26.198 | 0.27 | | | | |
| S48 | 23.274 | 0.64 | 1.582 | 30.182 | 4.878 | The Fourth Lens L44 |
| S49 | −3.226 | 0.41 | | | | |
| S410 | −1.592 | 0.46 | 1.535 | 56.115 | −2.441 | The Fifth Lens L45 |
| S411 | 8.177 | 0.20 | | | | |
| S412 | ∞ | 0.21 | 1.516 | 64.19 | | Optical Filter OF4 |
| S413 | ∞ | 0.34 | | | | |

The definition of aspheric surface sag z of each aspheric surface in table 10 is the same as that of in Table 1, and is not described here again.

In the fourth embodiment, the conic constant k and the aspheric coefficients A, B, C, D, E, F, G, H, I of each aspheric surface are shown in Table 11.

TABLE 11

| Surface Number | k | A | B | C | D |
|---|---|---|---|---|---|
| | | E | F | G | H | I |
| S42 | −2.80E−01 | −1.91E−02 | 7.32E−02 | −1.68E−01 | 1.59E−01 |
| | | −2.36E−02 | −7.90E−02 | 4.33E−02 | 0 | 0 |
| S43 | −9.70E+03 | −1.18E−01 | 1.00E−01 | 2.20E−02 | −3.73E−01 |
| | | 1.05E−01 | 8.82E−01 | −7.47E−01 | 0 | 0 |
| S44 | 1.24E+02 | −4.61E−02 | 1.99E−01 | −2.42E−01 | 1.07E−01 |
| | | −6.43E−02 | 2.97E−01 | −1.70E−01 | 0 | 0 |
| S45 | 1.10E+03 | 6.76E−02 | −8.67E−02 | 3.84E−01 | −6.70E−01 |
| | | 5.44E−01 | −2.27E−01 | 8.96E−02 | 0 | 0 |
| S46 | −1.05E+03 | −1.80E−01 | 3.58E−02 | 1.14E−01 | −3.17E−02 |
| | | −1.04E+00 | 1.86E+00 | −1.00E+00 | 0 | 0 |
| S47 | −9.75E+03 | −1.93E−01 | 6.76E−02 | −1.97E−02 | −5.37E−02 |
| | | 5.22E−02 | 1.19E−02 | −1.15E−02 | 0 | 0 |
| S48 | −1.27E+03 | −7.64E−02 | −7.15E−02 | −1.60E−03 | −1.01E−03 |
| | | −1.99E−02 | 1.11E−02 | 2.38E−03 | 0 | 0 |
| S49 | 2.44E−01 | 9.87E−02 | −8.04E−02 | 2.18E−02 | −3.25E−03 |
| | | 8.75E−04 | −1.78E−04 | 4.83E−06 | 0 | 0 |
| S410 | −6.13E+00 | −8.32E−02 | 4.55E−02 | −1.10E−02 | 1.56E−03 |
| | | −1.35E−04 | 7.28E−06 | −1.94E−07 | 0 | 0 |
| S411 | −8.57E−01 | −6.27E−02 | 1.77E−02 | −4.77E−03 | 6.87E−04 |
| | | 1.43E−06 | −1.44E−05 | 1.27E−06 | 0 | 0 |

Table 12 shows the parameters and condition values for conditions (1)-(8) in accordance with the fourth embodiment of the invention. It can be seen from Table 12 that the lens assembly 4 of the fourth embodiment satisfies the conditions (1)-(8).

TABLE 12

| $CTE_1$ | 14.5 × 10⁻⁶/° C. | $CTE_2$ | 60 × 10⁻⁶/° C. | $D_1$ | 2 mm |
|---|---|---|---|---|---|
| $D_2$ | 1.766 mm | $D_3$ | 2.49 mm | $D_4$ | 3.338 mm |
| $D_5$ | 5.1 mm | ALD | 14.694 mm | AAG | 1.1 mm |
| $TTL/T_1$ | 3.92 | $CTE_1 + CTE_2$ | 74.5 × 10⁻⁶/° C. | $f/T_1$ | 3.52 |
| TTL/AAG | 4.17 | $T_1/AAG$ | 1.06 | $(f_4 + T_1)/f$ | 1.47 |
| $D_1/ALD$ | 0.14 | $f/D_1$ | 2.06 | | |

Figure 8A:
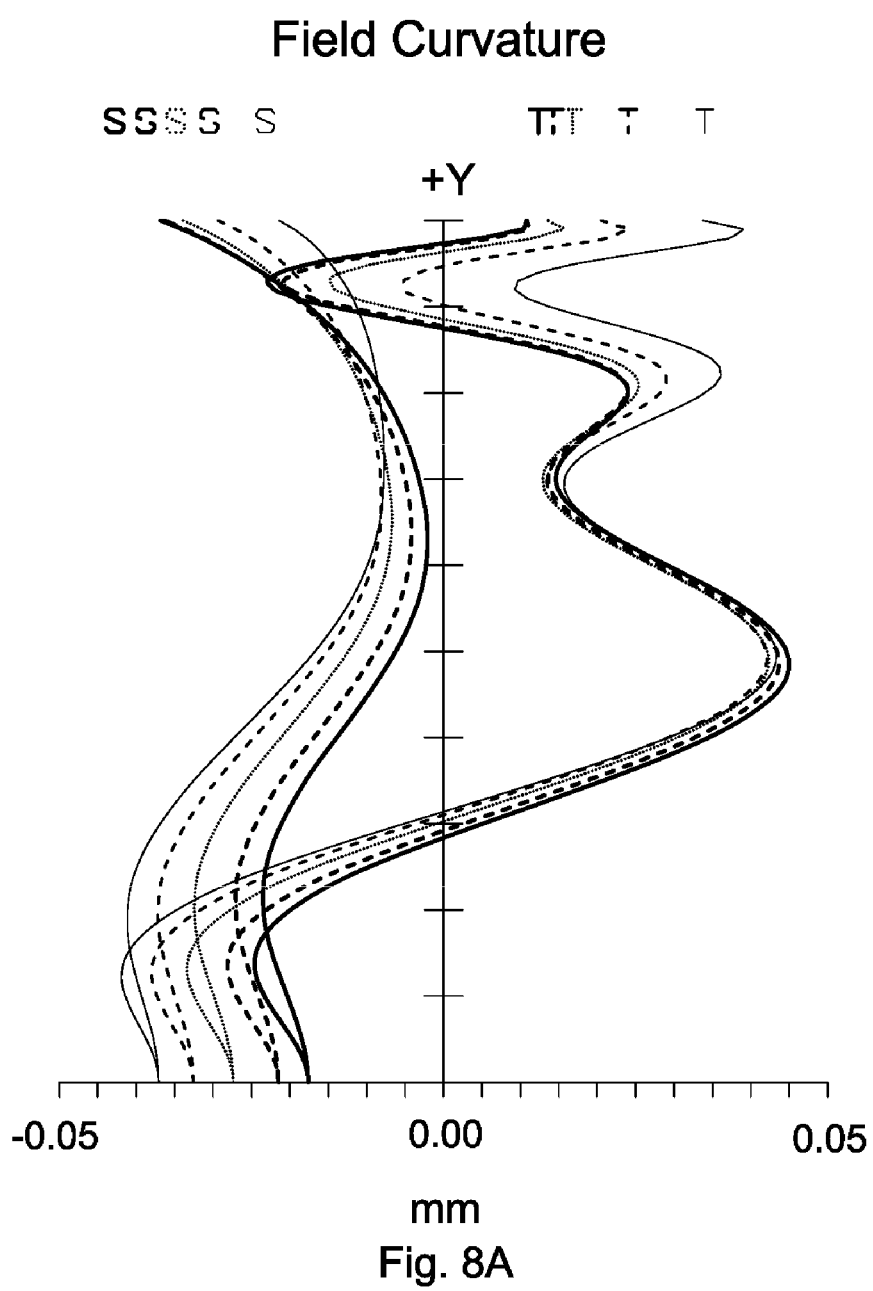
FIG. 8A depicts a field curvature diagram of the lens assembly in accordance with the fourth embodiment of the invention.
Figure 8B:
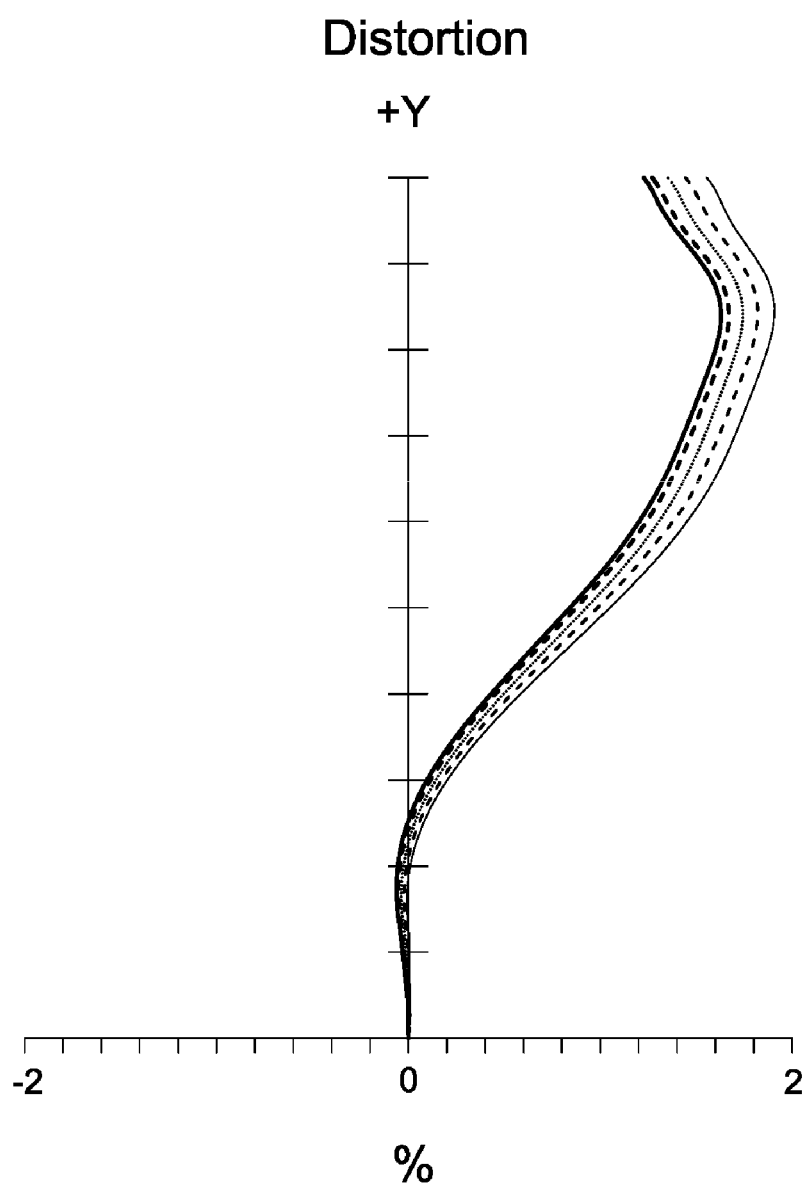
FIG. 8B is a distortion diagram of the lens assembly in accordance with the fourth embodiment of the invention.
Figure 8C:
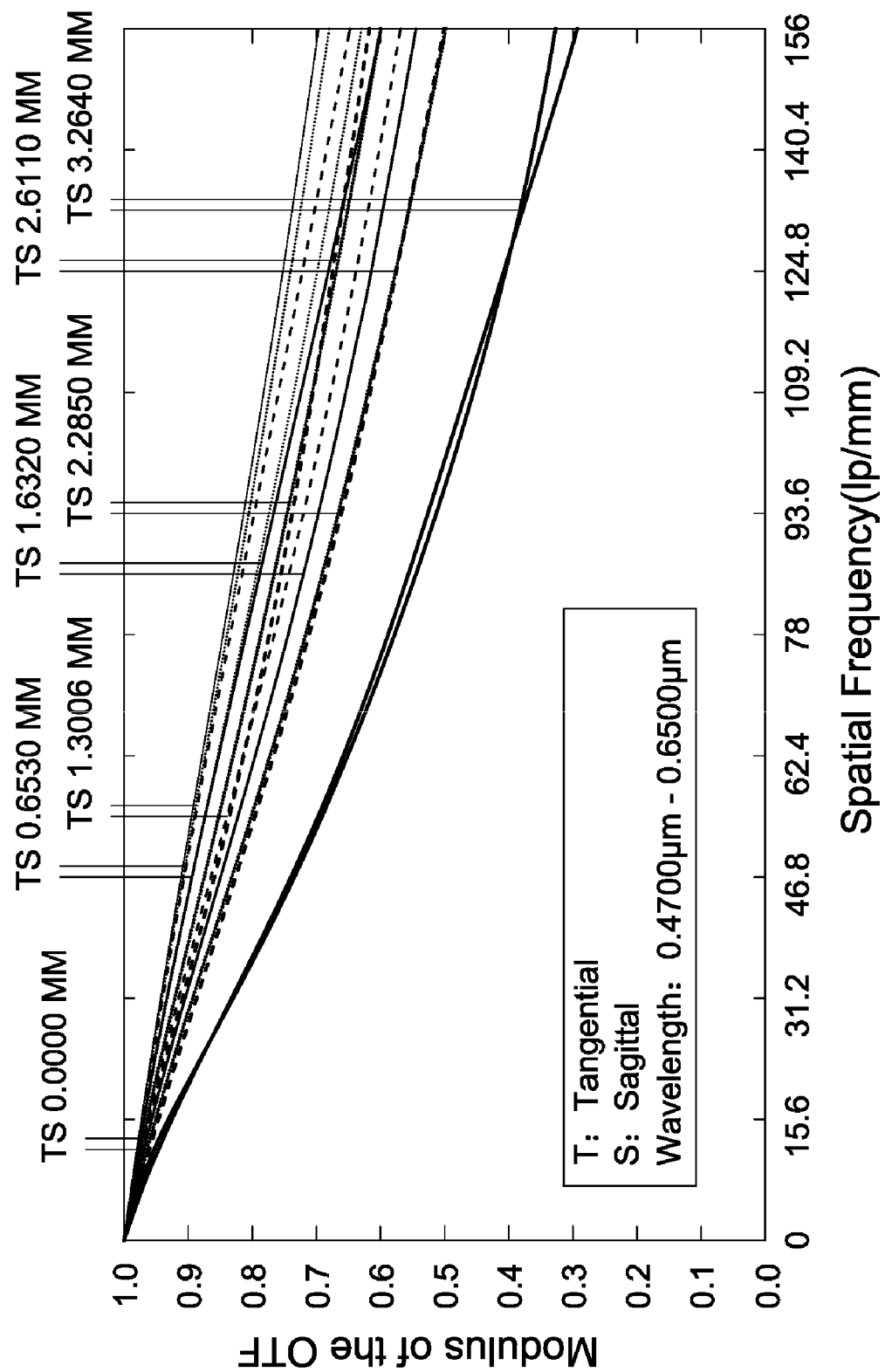
FIG. 8C is a modulation transfer function diagram of the lens assembly in accordance with the fourth embodiment of the invention.

By the above arrangements of the lenses and stop ST4, the lens assembly 4 of the fourth embodiment can meet the requirements of optical performance as seen in FIGS. 8A-8C, wherein FIG. 8A shows a field curvature diagram of the lens assembly 4 in accordance with the fourth embodiment of the invention, FIG. 8B shows a distortion diagram of the lens assembly 4 in accordance with the fourth embodiment of the invention, and FIG. 8C shows a modulation transfer function diagram of the lens assembly 4 in accordance with the fourth embodiment of the invention.

It can be seen from FIG. 8A that the field curvature of tangential direction and sagittal direction in the lens assembly 4 of the fourth embodiment ranges from −0.045 mm to 0.045 mm.

It can be seen from FIG. 8B that the distortion in the lens assembly 4 of the fourth embodiment ranges from −0.2% to 2%.

It can be seen from FIG. 8C that the modulation transfer function of tangential direction and sagittal direction in the lens assembly 4 of the fourth embodiment ranges from 0.29 to 1.0.

It is obvious that the field curvature and the distortion of the lens assembly 4 of the fourth embodiment can be corrected effectively, and the resolution of the lens assembly 4 of the fourth embodiment can meet the requirement. Therefore, the lens assembly 4 of the fourth embodiment is capable of good optical performance.

Figure 9:
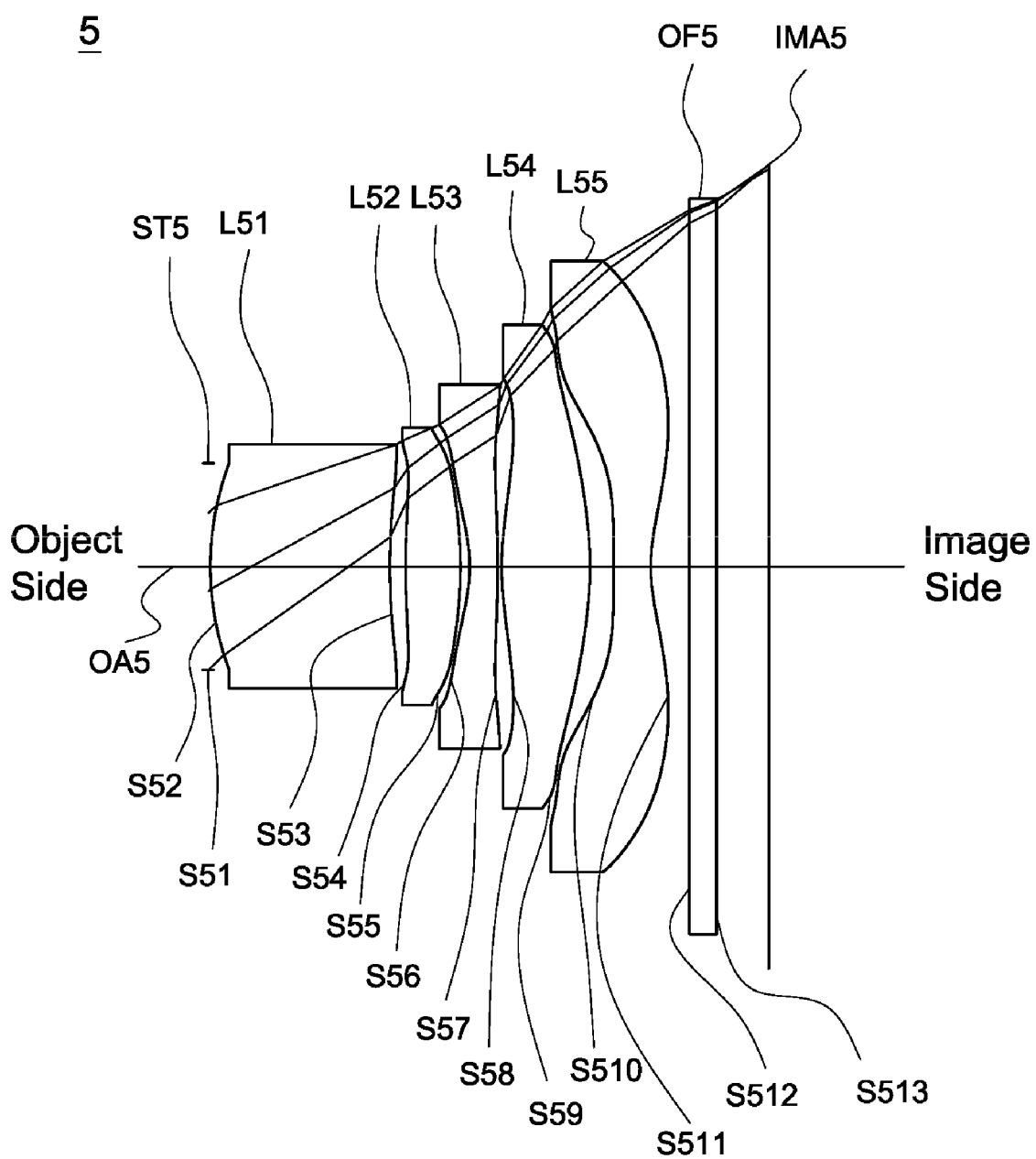
FIG. 9 is a lens layout and optical path diagram of a lens assembly in accordance with a fifth embodiment of the invention.

Referring to FIG. 9, FIG. 9 is a lens layout and optical path diagram of a lens assembly in accordance with a fifth embodiment of the invention. The lens assembly 5 includes a stop ST5, a first lens L51, a second lens L52, a third lens L53, a fourth lens L54, a fifth lens L55, and an optical filter OF5, all of which are arranged in order from an object side to an image side along an optical axis OA5. In operation, an image of light rays from the object side is formed at an image plane IMA5.

According to paragraphs [0045]-[0054], wherein: the surface profiles of the first lens L51 approximate to that of the first lens L11 of the lens assembly 1 of the first embodiment, and is not described here again; the surface profiles of the second lens L52 approximate to that of the second lens L12 of the lens assembly 1 of the first embodiment, and is not described here again; the third lens L53 is a meniscus lens, wherein the object side surface S56 is a concave surface and the image side surface S57 is a convex surface; the fourth lens L54 is a biconvex lens, wherein the object side surface S58 is a convex surface; the fifth lens L55 is a meniscus lens, wherein the object side surface S510 is a convex surface, and both of the object side surface S512 and image side surface S513 of the optical filter OF5 are plane surfaces.

With the above design of the lenses and stop ST5 and at least any one of the conditions (1)-(8) satisfied, the lens assembly 5 can have an effective shortened total lens length, an effective increased resolution, an effective reduced effective optical diameter of the lens closest to the object side, and is capable of an effective corrected aberration.

Table 13 shows the optical specification of the lens assembly 5 in FIG. 9.

TABLE 13

Effective Focal Length = 3.165 mm F-number = 2.25
Total Lens Length = 4.32 mm Field of View = 76.7 Degrees

| Surface Number | Radius of Curvature (mm) | Thickness (mm) | Nd | Vd | Effective Focal Length (mm) | Remark |
|---|---|---|---|---|---|---|
| S51 | ∞ | 0.015 | | | | Stop ST5 |
| S52 | 1.757 | 1.385 | 1.595 | 67.735 | 4.124 | The First Lens L51 |
| S53 | 4.331 | 0.121 | | | | |
| S54 | 5.632 | 0.424 | 1.535 | 56.115 | 3.186 | The Second Lens L52 |
| S55 | −2.393 | 0.070 | | | | |
| S56 | −0.950 | 0.217 | 1.671 | 19.243 | −1.661 | The Third Lens L53 |
| S57 | −6.641 | 0.030 | | | | |
| S58 | 1.646 | 0.683 | 1.671 | 19.243 | 1.445 | The Fourth Lens L54 |
| S59 | −2.015 | 0.180 | | | | |
| S510 | 13.889 | 0.288 | 1.671 | 19.243 | −1.671 | The Fifth Lens L55 |
| S511 | 1.038 | 0.300 | | | | |
| S512 | ∞ | 0.21 | 1.516 | 64.19 | | Optical Filter OF5 |
| S513 | ∞ | 0.339 | | | | |

The definition of aspheric surface sag z of each aspheric surface in table 13 is the same as that of in Table 1, and is not described here again.

In the fifth embodiment, the conic constant k and the aspheric coefficients A, B, C, D, E, F, G, H, I of each aspheric surface are shown in Table 14.

TABLE 14

| Surface Number | k | A F | B G | C H | D I | E |
|---|---|---|---|---|---|---|
| S52 | −8.97E−01 | −1.72E−02 | 2.89E−01 | −1.34E+00 | 2.57E+00 | 8.88E−01 |
| | | −8.46E+00 | −1.53E+00 | 2.93E+01 | −2.55E+01 | |
| S53 | −1.90E+01 | 1.08E−01 | −2.60E−01 | −7.97E−01 | 5.61E+00 | −1.18E+01 |
| | | 3.07E+00 | 2.24E+01 | −3.15E+01 | 1.37E+01 | |

TABLE 14-continued

| Surface Number | k | A<br>F | B<br>G | C<br>H | D<br>I | E |
|---|---|---|---|---|---|---|
| S54 | 0.00E+00 | 3.13E-02<br>1.50E+00 | -2.74E-01<br>-2.39E+01 | -4.56E-01<br>4.08E+01 | 9.47E-01<br>-1.99E+01 | 9.42E-01 |
| S55 | -1.25E+01 | -4.90E-02<br>1.87E+00 | 4.38E-01<br>-1.46E+00 | -7.03E-01<br>-8.83E-02 | -4.79E-01<br>3.75E-01 | 3.68E-02 |
| S56 | -7.29E+00 | 1.47E-01<br>4.40E+00 | 1.46E-01<br>-2.88E+00 | 1.61E-01<br>-7.28E-01 | -1.06E+00<br>8.43E-01 | -1.01E+00 |
| S57 | 1.73E+01 | 5.12E-02<br>8.02E-02 | 2.07E-02<br>-3.82E-02 | 1.04E-01<br>1.60E-02 | -8.49E-02<br>-4.02E-03 | -6.01E-02 |
| S58 | -1.84E+01 | -1.61E-01<br>-1.17E-02 | 2.38E-01<br>-3.38E-02 | -2.23E-01<br>2.87E-02 | 4.72E-02<br>-7.43E-03 | 4.88E-02 |
| S59 | -3.24E+01 | -9.72E-02<br>-8.54E-04 | 1.29E-01<br>-7.69E-04 | -9.46E-02<br>-2.00E-04 | 1.96E-02<br>9.14E-05 | 7.63E-03 |
| S510 | 0.00E+00 | -5.43E-01<br>-1.88E-02 | 5.21E-01<br>4.23E-03 | -3.66E-01<br>1.26E-04 | 1.50E-01<br>-8.04E-05 | -1.44E-03 |
| S511 | -8.82E+00 | -2.15E-01<br>7.49E-04 | 1.70E-01<br>7.88E-06 | -9.86E-02<br>-2.50E-06 | 3.68E-02<br>-3.50E-07 | -7.94E-03 |

Table 15 shows the parameters and condition values for conditions (1)-(8) in accordance with the fifth embodiment of the invention. It can be seen from Table 15 that the lens assembly 5 of the fifth embodiment satisfies the conditions (1)-(8).

TABLE 15

| $CTE_1$ | $11.7 \times 10^{-6}/°$ C. | $CTE_2$ | $61 \times 10^{-6}/°$ C. | $D_1$ | 1.67 mm |
|---|---|---|---|---|---|
| $D_2$ | 1.894 mm | $D_3$ | 2.484 mm | $D_4$ | 3.302 mm |
| $D_5$ | 4.17 mm | ALD | 13.52 mm | AAG | 0.40 mm |
| $TTL/T_1$ | 3.12 | $CTE_1 + CTE_2$ | $72.7 \times 10^{-6}/°$ C. | $f/T_1$ | 2.29 |
| TTL/AAG | 10.78 | $T_1/AAG$ | 3.46 | $(f_4+ T_1)/f$ | 0.89 |
| $D_1/LD$ | 0.12 | $f/D_1$ | 1.90 | | |

Figure 10A:
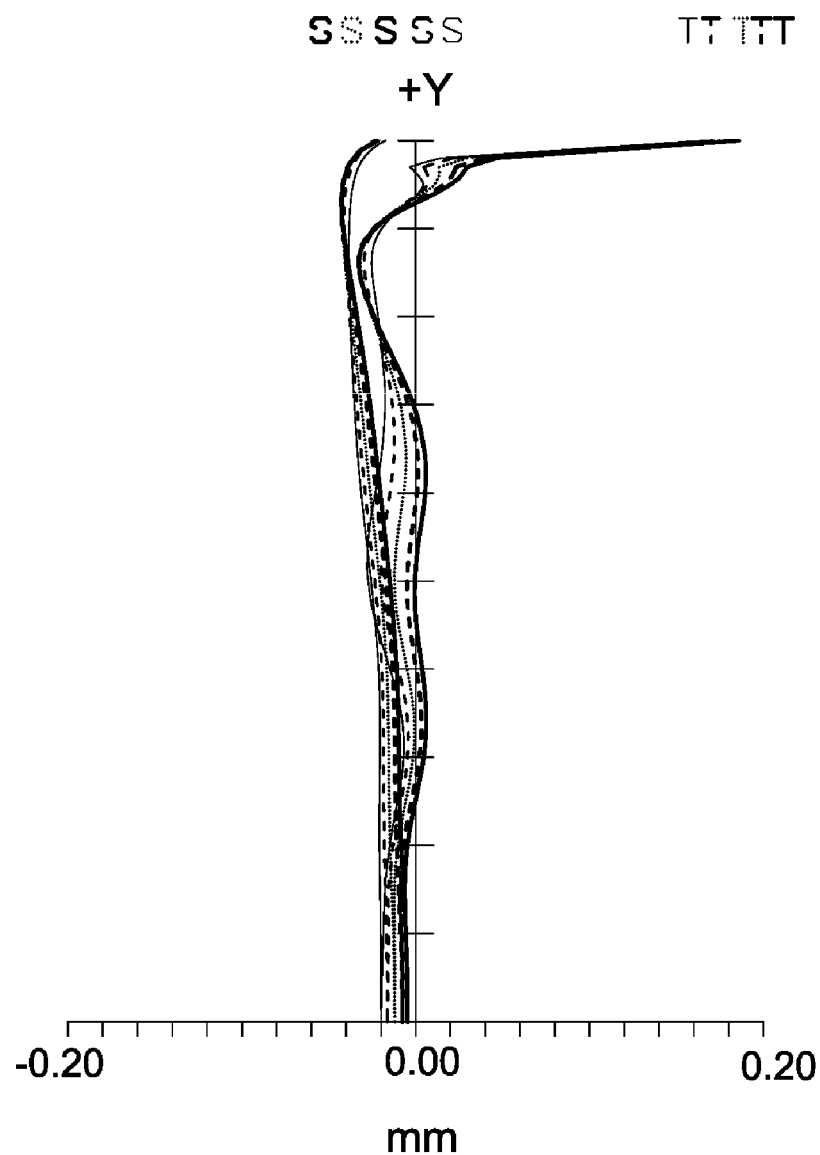
FIG. 10A depicts a field curvature diagram of the lens assembly in accordance with the fifth embodiment of the invention.
Figure 10B:
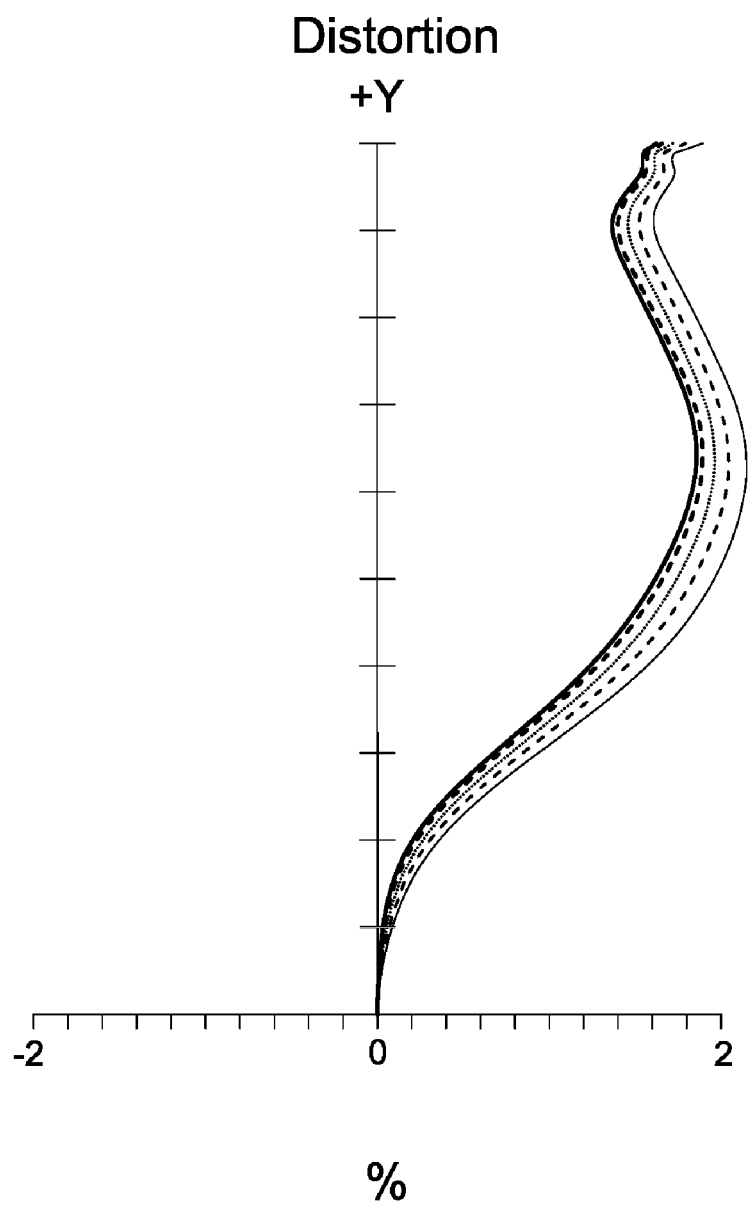
FIG. 10B is a distortion diagram of the lens assembly in accordance with the fifth embodiment of the invention.
Figure 10C:
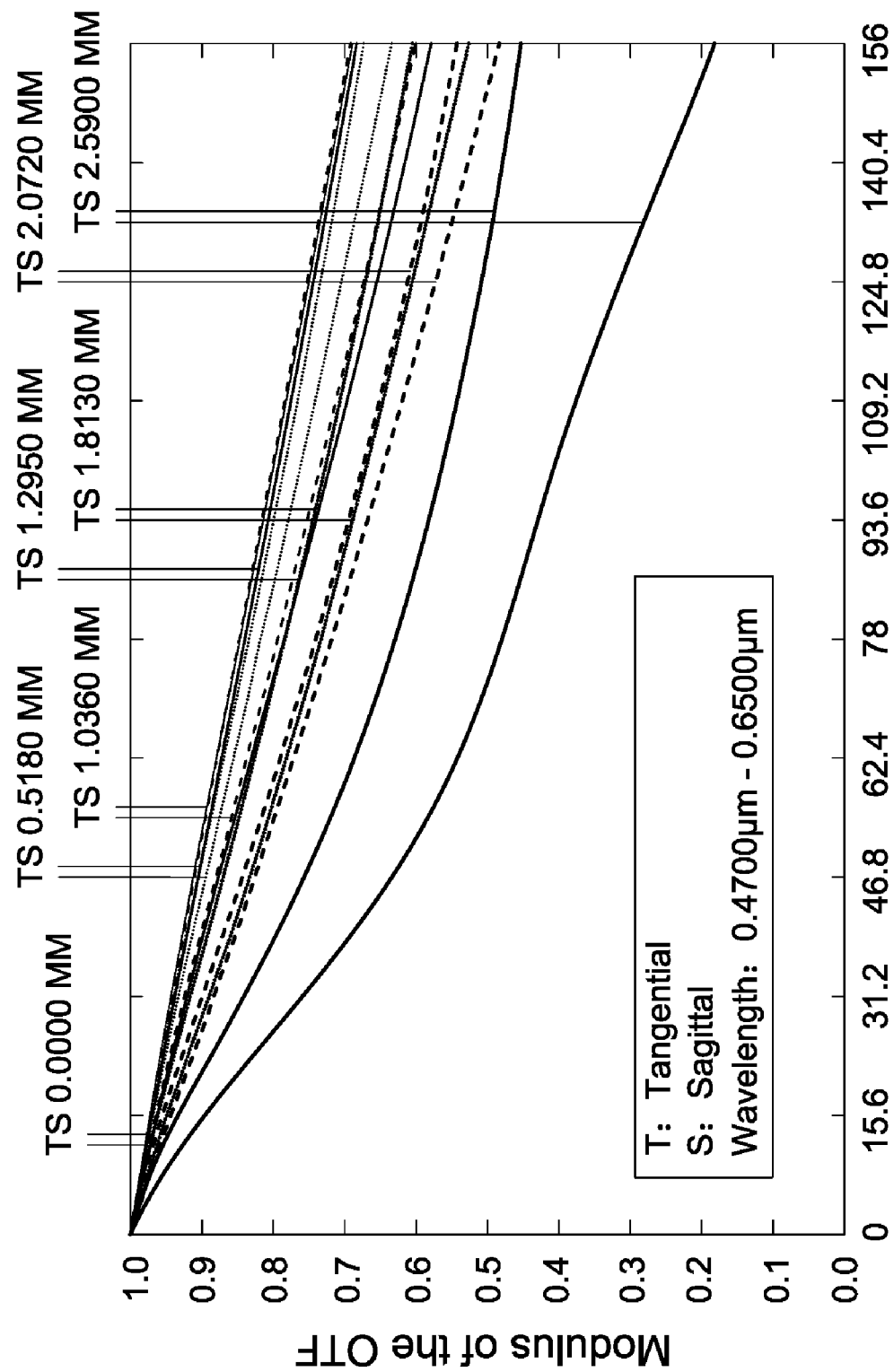
FIG. 10C is a modulation transfer function diagram of the lens assembly in accordance with the fifth embodiment of the invention.

By the above arrangements of the lenses and stop ST5, the lens assembly 5 of the fifth embodiment can meet the requirements of optical performance as seen in FIGS. 10A-10C, wherein FIG. 10A shows a field curvature diagram of the lens assembly 5 in accordance with the fifth embodiment of the invention, FIG. 10B shows a distortion diagram of the lens assembly 5 in accordance with the fifth embodiment of the invention, and FIG. 10C shows a modulation transfer function diagram of the lens assembly 5 in accordance with the fifth embodiment of the invention.

It can be seen from FIG. 10A that the field curvature of tangential direction and sagittal direction in the lens assembly 5 of the fifth embodiment ranges from −0.05 mm to 0.20 mm.

It can be seen from FIG. 10B that the distortion in the lens assembly 5 of the fifth embodiment ranges from 0% to 2%.

It can be seen from FIG. 10C that the modulation transfer function of tangential direction and sagittal direction in the lens assembly 5 of the fifth embodiment ranges from 0.18 to 1.0.

It is obvious that the field curvature and the distortion of the lens assembly 5 of the fifth embodiment can be corrected effectively, and the resolution of the lens assembly 5 of the fifth embodiment can meet the requirement. Therefore, the lens assembly 5 of the fifth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
    a first lens which is with positive refractive power and comprises a convex surface facing an object side;
    a second lens which is with refractive power and comprises a concave surface facing the object side;
    a third lens which is with negative refractive power and comprises a concave surface facing the object side;
    a fourth lens which is with positive refractive power and comprises a convex surface facing an image side and another convex surface facing the object side; and
    a fifth lens which is with negative refractive power and comprises a concave surface facing the image side;
    wherein the first lens, the second lens, the third lens, the fourth lens, and the fifth lens are arranged in order from the object side to the image side along an optical axis;
    wherein the lens assembly satisfies:

$1.5 < f/D_1 < 3.5;$ wherein f is an effective focal length of the lens assembly and $D_1$ is an effective optical diameter of the first lens;
    wherein the lens assembly satisfies at least one of the following conditions:

$61 \times 10^{-6}/°$ C. $< CTE_1 + CTE_2 < 81 \times 10^{-6}/°$ C.;

$0.10 < D_1/ALD < 0.15;$ wherein $CTE_1$ is a coefficient of thermal expansion of the first lens, $CTE_2$ is a coefficient of thermal expansion of the second lens, $D_1$ is an effective optical diameter of the first lens, and ALD is a total effective optical diameter of the first lens, the second lens, the third lens, the fourth lens, and the fifth lens.

2. The lens assembly as claimed in claim 1, wherein the second lens is with negative refractive power and comprises a concave surface facing the image side.

3. The lens assembly as claimed in claim 1, wherein:
the second lens is a biconcave lens with negative refractive power;
the third lens is a biconcave lens; and
the fifth lens further comprises a concave surface facing the object side.

4. The lens assembly as claimed in claim 1, wherein the lens assembly satisfies:

$$2<f/T_1<4;$$

wherein f is an effective focal length of the lens assembly and $T_1$ is a thickness of the first lens along the optical axis.

5. The lens assembly as claimed in claim 4, wherein the lens assembly satisfies:

$$4<TTL/AAG<12;$$

wherein TTL is an interval from the convex surface of the first lens to an image plane along the optical axis and AAG is a total air interval from an image side surface of the first lens to an object side surface of a lens which is closest to the image side along the optical axis.

6. The lens assembly as claimed in claim 5, wherein the lens assembly satisfies:

$$1<T_1/AAG<4;$$

wherein $T_1$ is a thickness of the first lens along the optical axis and AAG is a total air interval from an image side surface of the first lens to an object side surface of a lens which is closest to the image side along the optical axis.

7. The lens assembly as claimed in claim 4, wherein the lens assembly satisfies:

$$0.8<(f_4+T_1)/f<2.5;$$

wherein f is an effective focal length of the lens assembly, $f_4$ is an effective focal length of the fourth lens, and $T_1$ is a thickness of the first lens along the optical axis.

8. The lens assembly as claimed in claim 1, wherein the lens assembly satisfies:

$$2<TTL/T_1<5;$$

wherein TTL is an interval from the convex surface of the first lens to an image plane along the optical axis and $T_1$ is a thickness of the first lens along the optical axis.

9. A lens assembly comprising:
a first lens which is with positive refractive power and comprises a convex surface facing an object side;
a second lens which is with refractive power;
a third lens which is with negative refractive power and comprises a concave surface facing the object side;
a fourth lens which is with positive refractive power and comprises a convex surface facing an image side; and
a fifth lens which is with negative refractive power and comprises a concave surface facing the image side;
wherein the first lens, the second lens, the third lens, the fourth lens, and the fifth lens are arranged in order from the object side to the image side along an optical axis;
wherein the lens assembly satisfies:

$$61\times10^{-6}/°C.<CTE_1+CTE_2<81\times10^{-6}/°C.$$

wherein $CTE_1$ is a coefficient of thermal expansion of the first lens and $CTE_2$ is a coefficient of thermal expansion of the second lens.

10. The lens assembly as claimed in claim 9, wherein the lens assembly satisfies:

$$4<TTL/AAG<12$$

wherein TTL is an interval from the convex surface of the first lens to an image plane along the optical axis and AAG is a total air interval from an image side surface of the first lens to an object side surface of a lens which is closest to the image side along the optical axis.

11. The lens assembly as claimed in claim 9, wherein the lens assembly satisfies:

$$2<TTL/T_1<5;$$

$$2<f/T_1<4;$$

wherein TTL is an interval from the convex surface of the first lens to an image plane along the optical axis, $T_1$ is a thickness of the first lens along the optical axis, and f is an effective focal length of the lens assembly.

12. The lens assembly as claimed in claim 9, wherein the lens assembly satisfies:

$$0.10<D_1/ALD<0.15;$$

$$1<T_1/AAG<4;$$

wherein $D_1$ is an effective optical diameter of the first lens, ALD is a total effective optical diameter of the first lens, the second lens, the third lens, the fourth lens, and the fifth lens, AAG is a total air interval from an image side surface of the first lens to an object side surface of a lens which is closest to the image side along the optical axis, and $T_1$ is a thickness of the first lens along the optical axis.

13. The lens assembly as claimed in claim 11, wherein the lens assembly satisfies:

$$0.8<(f_4+T_1)/f<2.5;$$

wherein f is an effective focal length of the lens assembly, $f_4$ is an effective focal length of the fourth lens, and $T_1$ is a thickness of the first lens along the optical axis.

14. The lens assembly as claimed in claim 11, wherein the lens assembly satisfies:

$$1.5<f/D_1<3.5;$$

wherein f is an effective focal length of the lens assembly and $D_1$ is an effective optical diameter of the first lens.

15. The lens assembly as claimed in claim 14, wherein the second lens is with positive refractive power and comprises a convex surface facing the image side.

16. The lens assembly as claimed in claim 14, wherein:
the second lens is a biconcave lens with negative refractive power;
the third lens is a biconcave lens; and
the fifth lens further comprises a concave surface facing the object side.

17. A lens assembly comprising:
a first lens which is with positive refractive power and comprises a convex surface facing an object side;
a second lens which is with refractive power;
a third lens which is with negative refractive power and comprises a concave surface facing the object side;
a fourth lens which is with positive refractive power and comprises a convex surface facing an image side; and
a fifth lens which is with negative refractive power and comprises a concave surface facing the image side;

wherein the first lens, the second lens, the third lens, the fourth lens, and the fifth lens are arranged in order from the object side to the image side along an optical axis;
wherein the lens assembly satisfies:

$61 \times 10^{-6}/°C. < CTE_1 + CTE_2 < 81 \times 10^{-6}/°C.$;

$0.8 < (f_4 + T_1)/f < 2.5$;

wherein $CTE_1$ is a coefficient of thermal expansion of the first lens, $CTE_2$ is a coefficient of thermal expansion of the second lens, $f_4$ is an effective focal length of the fourth lens, f is an effective focal length of the lens assembly, and $T_1$ is a thickness of the first lens along the optical axis.

18. The lens assembly as claimed in claim 17, wherein the lens assembly satisfies at least one of the following conditions:

$2 < TTL/T_1 < 5$;

$2 < TTL/AAG < 4$;

$4 < TTL/AAG < 12$;

$1 < T_1/AAG < 4$;

$1.5 < f/D_1 < 3.5$;

$0.10 < D_1/ALD < 0.15$;

wherein TTL is an interval from the convex surface of the first lens to an image plane along the optical axis, $T_1$ is a thickness of the first lens along the optical axis, f is an effective focal length of the lens assembly, AAG is a total air interval from an image side surface of the first lens to an object side surface of a lens which is closest to the image side along the optical axis, ALD is a total effective optical diameter of the first lens, the second lens, the third lens, the fourth lens, and the fifth lens, and Di is an effective optical diameter of the first lens.

* * * * *